(12) United States Patent
Hsiung et al.

(10) Patent No.: US 6,865,509 B1
(45) Date of Patent: Mar. 8, 2005

(54) SYSTEM FOR PROVIDING CONTROL TO AN INDUSTRIAL PROCESS USING ONE OR MORE MULTIDIMENSIONAL VARIABLES

(75) Inventors: Chang-Meng B. Hsiung, Irvine, CA (US); Bethsabeth Munoz, Pasadena, CA (US); Ajoy Kumar Roy, Pasadena, CA (US); Michael Gregory Steinthal, Los Angeles, CA (US); Steven A. Sunshine, Pasadena, CA (US); Michael Allen Vicic, Pasadena, CA (US); Shou-Hua Zhang, Arcadia, CA (US)

(73) Assignee: Smiths Detection - Pasadena, Inc., Pasadena, CA (US)

( * ) Notice: Subject to any disclaimer, the term of this patent is extended or adjusted under 35 U.S.C. 154(b) by 330 days.

(21) Appl. No.: 09/802,512

(22) Filed: Mar. 9, 2001

Related U.S. Application Data

(60) Provisional application No. 60/188,565, filed on Mar. 10, 2000, provisional application No. 60/188,590, filed on Mar. 10, 2000, and provisional application No. 60/188,591, filed on Mar. 10, 2000.

(51) Int. Cl.[7] .................................................. G06F 11/30
(52) U.S. Cl. .............................. 702/182; 700/95; 703/6
(58) Field of Search .......................... 702/22–23, 30–32, 702/45, 50, 114, 179, 181–184, 186–189; 700/28, 32, 95, 108–110, 214–215, 282–285; 709/220; 706/45–48, 50; 422/105–108, 112, 114, 116; 703/6–12

(56) References Cited

U.S. PATENT DOCUMENTS

| | | | |
|---|---|---|---|
| 4,517,637 A | * | 5/1985 | Cassell ........................... 700/9 |
| 4,886,590 A | * | 12/1989 | Tittle .......................... 204/232 |
| 5,293,585 A | * | 3/1994 | Morita .......................... 706/45 |
| 5,410,492 A | | 4/1995 | Gross et al. ................. 702/185 |
| 5,452,234 A | * | 9/1995 | Heath et al. ................... 702/22 |
| 5,459,675 A | | 10/1995 | Gross et al. ................. 702/183 |
| 5,571,401 A | | 11/1996 | Lewis et al. ................. 205/787 |
| 5,629,872 A | | 5/1997 | Gross et al. ................. 702/116 |
| 5,634,039 A | * | 5/1997 | Simon et al. ................. 703/18 |
| 5,675,070 A | * | 10/1997 | Gelperin ..................... 73/23.34 |
| 5,697,326 A | | 12/1997 | Mottram et al. ............ 119/174 |

(List continued on next page.)

FOREIGN PATENT DOCUMENTS

| | | |
|---|---|---|
| EP | 0 959 398 A1 | 11/1999 |
| WO | WO 94/28557 | 12/1994 |
| WO | WO 97/08627 | 3/1997 |
| WO | WO 97/14105 | 4/1997 |
| WO | WO 97/49011 | 12/1997 |
| WO | WO 98/39718 | 9/1998 |
| WO | WO 99/26073 | 5/1999 |
| WO | WO 99/36920 | 7/1999 |

*Primary Examiner*—Patrick Assouad
*Assistant Examiner*—Mary Catherine Baran
(74) *Attorney, Agent, or Firm*—Foley & Lardner LLP

(57) ABSTRACT

A system for controlling an industrial process. The system includes an input module for receiving a plurality of parameters from a process for manufacture of a substance or object. The system also includes a library module. The library module includes a plurality of computer aided processes. Any one of the computer aided processes is capable of using each of the plurality of parameters to compare at least two of the plurality of parameters against a training set of parameters. The training set of parameters is generally predetermined. The computer aided process is also capable of determining if the at least two of the plurality of parameters are within a predetermined range of the training set of parameters. Additionally, the system includes an output module for outputting a result based upon the training set and the plurality of parameters.

56 Claims, 13 Drawing Sheets

U.S. PATENT DOCUMENTS

| | | | |
|---|---|---|---|
| 5,745,382 A | | 4/1998 | Vilim et al. .................... 706/16 |
| 5,761,090 A | | 6/1998 | Gross et al. .................... 714/26 |
| 5,764,509 A | | 6/1998 | Gross et al. |
| 5,774,379 A | * | 6/1998 | Gross et al. .................... 702/72 |
| 5,788,833 A | | 8/1998 | Lewis et al. ................. 205/787 |
| 5,807,701 A | | 9/1998 | Payne et al. ................... 435/34 |
| 5,891,398 A | | 4/1999 | Lewis et al. .............. 422/82.02 |
| 5,949,678 A | * | 9/1999 | Wold et al. .................... 700/83 |
| 5,987,399 A | | 11/1999 | Wegerich et al. ............ 702/183 |
| 6,308,231 B1 | * | 10/2001 | Galecki et al. ................ 710/72 |
| 6,317,701 B1 | * | 11/2001 | Pyotsia et al. ............... 702/188 |
| 6,409,909 B1 | * | 6/2002 | Spichiger-Keller et al. ........................ 205/777.5 |
| 6,414,594 B1 | * | 7/2002 | Guerlain ...................... 340/506 |
| 6,490,493 B1 | * | 12/2002 | Dharnipragada .............. 700/97 |
| 6,546,295 B1 | * | 4/2003 | Pyotsia et al. ................. 700/37 |

* cited by examiner

SYSTEM FOR PROVIDING CONTROL TO AN INDUSTRIAL PROCESS USING ONE OR MORE MULTIDIMENSIONAL VARIABLES

CROSS-REFERENCE TO RELATED APPLICATIONS

The instant nonprovisional patent application claims priority from the following three provisional patent applications, each filed Mar. 10, 2000 and incorporated herein by reference: U.S. provisional patent application No. 60/188,565; U.S. provisional patent application No. 60/188,590; and U.S. provisional patent application No. 60/188,591. The following nonprovisional patent applications are hereby incorporated by reference: U.S. nonprovisional patent application Ser. No. 09/802,519; and U.S. nonprovisional patent application Ser. No. 09/802,377.

BACKGROUND OF THE INVENTION

This invention in general relates to processing information or data over a network of computers. Embodiments of the present invention relate to techniques for monitoring and/or controlling complex processes by comparing the current state of a first process to current, historical, and/or predicted states of the first process or a second process using statistical, structural, or physical models. Other embodiments of the present invention provide a system including computer code for monitoring or controlling, or both monitoring and controlling a process using multi-dimensional data in a commercial setting. The multidimensional data can include, among others, intrinsic information such as temperature, acidity, chemical composition, and color, as well as extrinsic information, such as origin, and age. The multidimensional data can also include symbolic data that is primarily visual in nature and which does not readily lend itself to traditional quantification. Merely by way of example, the present invention is described below in conjunction with an industrial manufacturing process, but it would be recognized that the invention has a much broader range of applicability. The invention can be applied to monitor and control complex processes in other fields such as chemicals, electronics, biological, health care, petrochemical, gaming, hotel, commerce, machining, electrical grids, and the like. Embodiments of the present invention may further accomplish process control in real time utilizing a web-based architecture.

Techniques and devices for maintaining process control in complex processes are well known. Such techniques often require monitoring individual parameters such as temperature, pressure, flow, incoming fluid characteristics, and the like. Most of these techniques only monitor and adjust a single parameter. The single parameter is often monitored and displayed to an operator or user of the process through an electronic display. For example, refining a petroleum product such as oil or gas often uses temperature measurements of raw or in process fluids such as oil using thermocouples. These thermocouples are often attached to critical processes such as distillation and the like and then coupled to an electronic display for output. The display generally outputs signals corresponding to temperature in a graphical user interface form or numerical value in Celsius, for example. In the most primitive oil refining operations, for example, operators still monitor temperature of a process or processes using the display by visual means. If the temperature goes out of range, the operator merely adjusts the process. In more advanced applications, process controllers monitor and control temperature of processes. The process controllers often use proportional control, derivative control, integral control, or a combination of these to provide an optimum control of temperature for the process. These techniques, however, still only monitor a single parameter such as temperature and adjust such temperature by feedback control means.

Oil refining is merely one of many examples of industrial processes that require control. Other examples include food processing, chemical production, drug manufacturing, semiconductor processing, water treatment, agriculture, assembly operations, health care, electronic power, gaming, hotel, and other commerce related fields. All of these examples generally use fairly crude processing techniques for adjusting complex processing variables such as temperature, pressure, flow rate, speed, and others, one at a time using automatic feed back control or manual feed back control. In some applications, fairly complex sensor assemblies are used to monitor process parameters. U.S. Pat. No. 5,774,374 in the name of Gross et al. and assigned to the University of Chicago, describes one way of monitoring an industrial or biological process using sensors. This conventional approach relies upon comparing a measured signal against a reference signal by subjective criteria. However, the subjective criteria have often been determined by trial and error and are only as good as the person deciding upon such criteria.

Many limitations still exist with some or all of these techniques. For example, most of these techniques still only monitor a single parameter and adjust it against a subjective reference point. Human monitoring of multiple parameters is often required, which is only as good as the human operator. Additionally, many if not all of these techniques cannot monitor the quality of a substance in process. Here, only extrinsic variables such as temperature, pressure, and the like can be easily monitored. There is simply no easy way to monitor the substance itself while it is being processed. Although complex chemical analysis methods are available to determine specific components or weights of the substance, there is simply no easy way to identify the quality of the substances while it is being manufactured. These and many other limitations are described throughout the present specification and more particularly below.

From the above, it is seen that improved ways of monitoring or controlling a process, or both monitoring and controlling a process, are highly desirable.

SUMMARY OF THE INVENTION

According to the present invention, a technique for processing information or data over a network of computers is provided, including a system for monitoring or controlling a process, or both monitoring and controlling a process. Embodiments of the present invention provide a system including computer codes for process monitoring and/or control using multidimensional data. The multidimensional data can include, among others, intrinsic information such as temperature, acidity, chemical composition, and color, as well as extrinsic information such as origin, and age.

In accordance with embodiments of the present invention, a process may be monitored and/or controlled by comparing the current state of a first process to current, historical, and/or predicted states of the first process or of a second process through the use of statistical, structural, or physical models. The process is then monitored and/or controlled based upon a descriptor predicted by the model. For purposes of this application, the term "descriptor" includes model coefficients/parameters, loadings, weightings, and labels, in addition to other types of information.

An embodiment of a system for monitoring an industrial process in accordance with the present invention comprises a process controller and an input module coupled to the process controller, the input module being adapted to input a plurality of parameters from a process for manufacture of a substance. A computer aided process module is coupled to the process controller, the computer aided process module being adapted to compare at least two of the plurality of parameters against a predetermined training set of parameters, and being adapted to determine if the at least two of the plurality of parameters are within a predetermined range of the training set of parameters. An output module is coupled to the process controller, the output module being adapted to output a result based upon the determining step.

An embodiment of a system for monitoring an industrial process for the manufacture of materials or objects in accordance with the present invention comprises an input module, the input module being adapted to input a plurality of process parameters from a process for manufacture of a substance or object. A library module is coupled to the input module, the library module including a plurality of computer aided processes, each of the computer aided processes being capable of determining an output based upon a predetermined training set of the plurality of process parameters. An output module is coupled to the library module, the output module being adapted to output a result based upon the predetermined training set and the plurality of process parameters, wherein each of the computer aided processes compares at least two of the plurality of process parameters against a portion of the training set of parameters and determines if the at least two of the plurality of process parameters are within a predetermined range of the portion of the training set of parameters.

An embodiment of a system for controlling a process comprises a first field mounted device in communication with a process and configured to produce a first input. A process manager receives the first input and is configured to apply a first model to the first input to identify a first predicted descriptor characteristic of a state of the process. The process manager is also configured to consult a first knowledge based system to provide an output based upon the first predicted descriptor.

Numerous benefits are achieved by way of the present invention over conventional techniques. For example, because of its web-based architecture, embodiments of the present invention permit monitoring and/or control over a process to be performed by a user located virtually anywhere. Additionally, embodiments of the invention permit monitoring and control over a process in real time, such that information about the process can rapidly be analyzed by a variety of techniques, with corrective steps based upon the analysis implemented immediately.

Further, because the invention utilizes a plurality of analytical techniques in parallel, the results of these analytical techniques can be cross-validated, enhancing the reliability and accuracy of the resulting process monitoring or control. The present invention can be used with a wide variety of processes, e.g., those utilized in the chemical, biological, petrochemical, and food industries. However, the present invention is not limited to controlling the process of any particular industry, and is generally applicable to control over any process. Depending upon the embodiment, one or more of these benefits may be achieved. These and other benefits will be described in more detail throughout the present specification and more particularly below.

Various additional objects, features and advantages of the present invention can be more fully appreciated with reference to the detailed description and accompanying drawings that follow.

DETAILED DESCRIPTION OF THE INVENTION AND SPECIFIC EMBODIMENTS

The present invention relates to processing information or data over a network of computers. More specifically, embodiments of the present invention include methods, systems, and computer code for monitoring or controlling a process, or for both monitoring and controlling a process.

Figure 1:
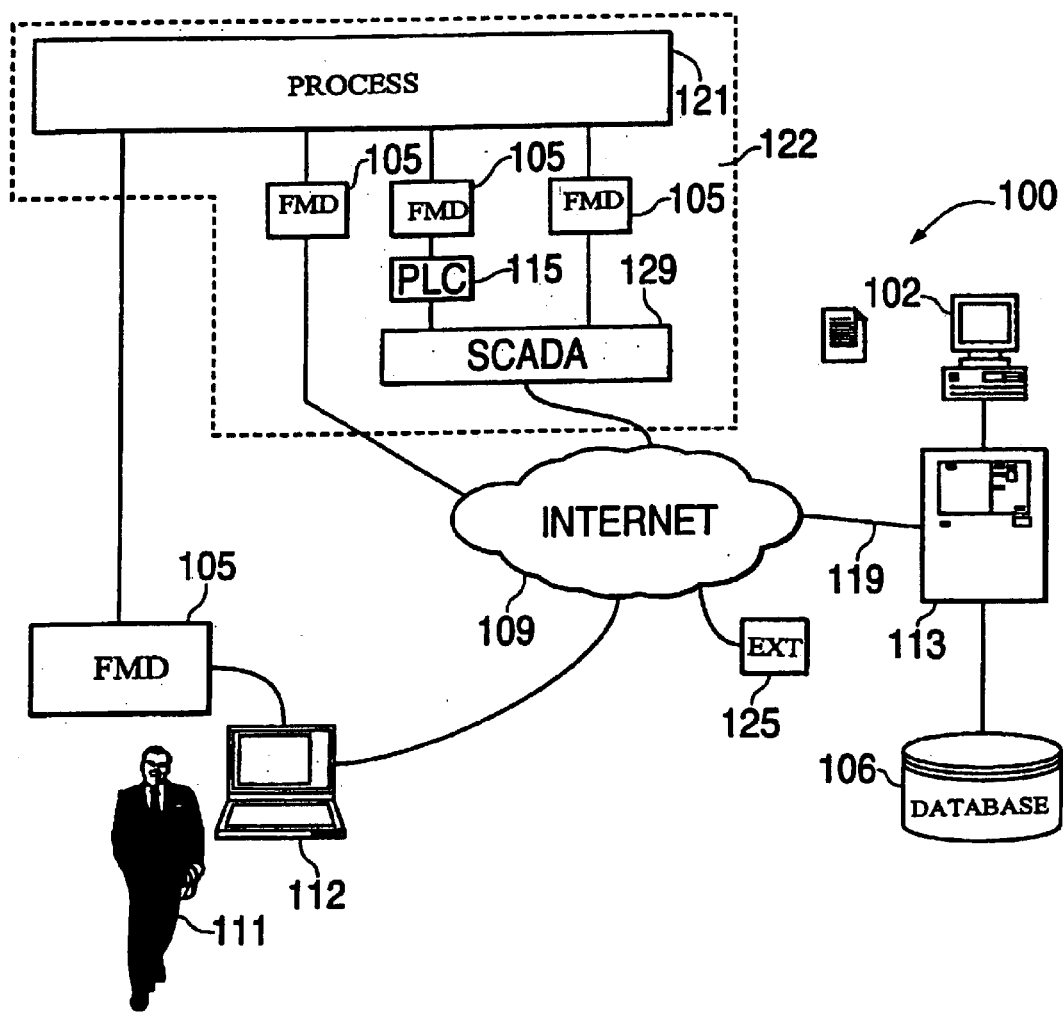
FIG. 1 is a simplified diagram of an environmental information analysis system according to an embodiment of the present invention.

FIG. 1 is a simplified diagram of an integrated computer aided system 100 for monitoring and controlling a process according to an embodiment of the present invention. This diagram is merely an example which should not limit the scope of the claims herein. One of ordinary skill in the art would recognize many other variations, modifications, and alternatives.

As shown, system 100 includes a variety of sub-systems that are integrated and coupled with one another through a web-based architecture. One example of such a sub-system is wide area network 109 which may comprise, for example, the Internet, an intranet, or another type of network. The Internet is shown symbolically as a cloud or a collection of server routers, computers, and other devices.

As used in this patent application and in industry, the concepts of "client" and "server," as used in this application and the industry, are very loosely defined and, in fact, are not fixed with respect to machines or software processes executing on the machines. Typically, a server is a machine e.g. or process that is providing information to another machine or process, i.e., the "client," e.g., that requests the information. In this respect, a computer or process can be acting as a client at one point in time (because it is requesting information) and can be acting as a server at another point in time (because it is providing information). Some computers are consistently referred to as "servers" because they usually act as a repository for a large amount of information that is often requested. For example, a website is often hosted by a server computer with a large storage capacity, high-speed processor and Internet link having the ability to handle many high-bandwidth communication lines.

Wide area network 109 allows for communication with other computers such as a client unit 112. Client 112 can be configured with many different hardware components and can be made in many dimensions, styles and locations (e.g., laptop, palmtop, pen, server, workstation and mainframe).

Server 113 is coupled to the Internet 109. The connection between server 113 and internet 109 is typically by a relatively high bandwidth transmission medium such as a T1 or T3 line, but can also be other media, including wireless communication. Terminal 102 is also connected to server 1113. This connection can be by a network such as Ethernet, asynchronous transfer mode, IEEE standard 1553 bus, modem connection, universal serial bus, etc. The communication link need not be in the form of a wire, and could also be wireless utilizing infrared, radio wave transmission, etc.

Another subsystem of system 100 of FIG. 1 are the various field mounted devices 105 in contact with process 121 located in plant 122. While FIG. 1 does illustrate process monitoring/control in conjunction with an industrial process, the present invention is not limited to such an application. Other types of complex processes, such as medical diagnostic procedures, could also be monitored and/or controlled in accordance with embodiments of the present invention.

Field mounted devices 105 can include sensors, transmitters, actuators, multifunctional devices, or Remote Terminal Units (RTU's), among others. As shown in FIG. 1, field mounted devices 105 may be controlled by a device such as a programmable logic controller (PLC) 115. Field mounted devices 105 are generally coupled to a central Supervisory Control and Data Acquisition (SCADA) system 129. SCADA system 129 enables control, analysis, monitoring, storage and management of the information flow between the systems at the field level and at the control level of a company. This ensures that the decentralized I/O modules and the machine controllers are linked to the office computers on the control level. Components of control, analysis, monitoring. A particular process may utilize more than one SCADA system at a time.

FIG. 1 also shows that a field mounted device 105 may be linked directly with internet 109, bypassing SCADA 129 and other common interfaces altogether. Such an arrangement will become increasingly prevalent as the use of web-enabled devices (devices including devoted hardware/software interfaces) increases. And while FIG. 1 shows wire-based direct communication between a field mounted device and the internet, such web-enabled devices may alternatively communicate directly with the internet through wireless technology.

FIG. 1 further shows that a field mounted device 105 may be coupled to a laptop client computer 112 that is in turn in communication with internet 109. This latter configuration is particularly useful where a particular field mounted device is not permanently linked to the process via SCADA system 129, but is instead transported to process 121 and temporarily installed by technician 111 for specialized diagnostic or control purposes.

Field mounted devices 105 can be similar or can also be different, depending upon the application. One example of a field mounted device is a sensing element for acquiring olfactory information from fluid substances, e.g., liquid, vapor, liquid/vapor. Once the information is acquired by field mounted device 105, device 105 may transfer information to server 113 for processing purposes. In one aspect of the present invention, process 121 is monitored and controlled using information that includes multi-dimensional data. Details of the processing hardware is shown below and illustrated by the Figs.

Database 106 is connected to server 113. Database 106 includes information useful for process control and monitoring functions. For example, database 106 may store information regarding process 121 received from field mounted devices 105. Database 106 may also include a library of different algorithms or models that may be used to monitor and control industrial process 121. Alternatively, such a library of algorithms or models may be resident on server 113.

In accordance with embodiments of the present invention, the outcome of applying a specific algorithm or model to process 121 may be internally cross-validated by comparing the result application of other algorithms or models to the same data. Examples of specific algorithms and models, and their role in process control/monitoring methods and systems in accordance with embodiments of the present invention, are described more fully below.

FIG. 1 also shows that internet 109 is linked to one or more external systems 125. Examples of such external systems include Enterprise Resource Planning (ERP) systems and Lab Information Management Systems (LIMS). External system 125 could also be a duplicate or sister process of process 121, such that the state of process 121 may be externally validated by comparison with the results of the second process.

Figure 1A:
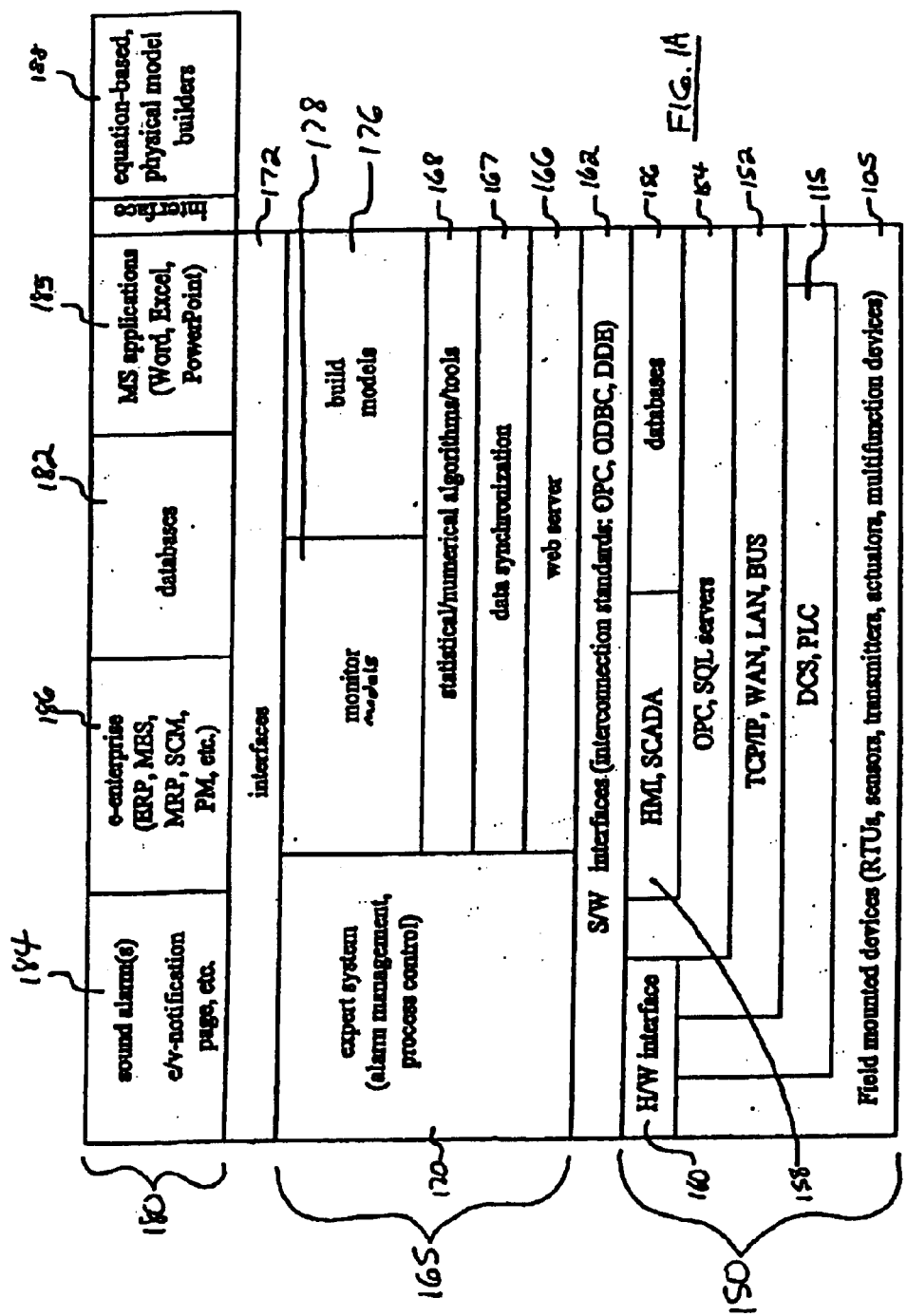
FIG. 1A is a simplified block diagram showing a process monitoring and control system in accordance with one embodiment of the present invention.

FIG. 1A is a simplified block diagram showing a process monitoring and control system in accordance with one embodiment of the present invention. FIG. 1A shows various layers where information is gathered, distributed, and/or processed.

Bottom portion 150 of FIG. 1A represents structures that are in general located proximate to the physical location of the process itself, such as in the manufacturing plant. The lowest layer of portion 150 represents field mounted devices 105 such as RTU's, sensors, actuators, and multifunctional devices in direct contact with the process. The next layer represents logic devices 115 such as programmable logic controllers (PLC) that receive signals from and transmit signals to, field mounted devices 105. The next layer of FIG. 1A represents communication structures 152 such as buses, wide area networks (WAN), or local area networks (LAN) that enable communication using TCP/IP protocols of data collected by field mounted devices 105 to a centralized location. This centralized location is represented by the next layer as Structured Query Language (SQL) or OPC (OLE for Process Control, where OLE is Object U Linking and Embedding) server 154. Server 154 includes an interface with database 156, used for example to store archived process data, and also typically includes a user interface 158. The user interface can be a direct human machine interface (HMI), or as previously described can take the form of a SCADA system.

Field mounted devices 105, logic devices 115, communication structures 152, and server 154 are each in communication with hardware interface 160 that is in turn in communication with software interface 162. Software interface 162 links bottom portion 150 of FIG. 1A with middle portion 165 of FIG. 1A.

Middle portion 165 represents process control and monitoring processes in accordance with embodiments of the present invention. An input module includes software interface 162 which couples information from the conventional processing plant to a plurality of processes for operations and analysis. As known to those of skill in the art, the software interface 162 may take the form of several standards, including Open DataBase Connectivity (ODBC), or Dynamic Data Exchange (DDE) standards. Software interface 162 in turn couples with server 166, rendering both inputs and outputs of the process control system accessible via web-based communication. Specifically, data from the process may be acquired over the internet, and outputs from the system may be accessed by a user over the internet utilizing browser software.

In the next layer 167, data received by server 166 is synchronized to permit orderly assimilation for monitoring and control purposes. In the next layer 168, the assimilated data is examined and manipulated using a variety of techniques, including statistical/numerical algorithms and tools 168, expert systems 170, and others. These processes also include model building 176 to accurately predict behavior of the process, and model monitoring 178 based upon inputs received from the plant.

Common interface 172 is part of an output module that couples the analysis processes of middle portion 165 with selected legacy systems shown in top portion 180 of FIG. 1A. Such legacy systems include databases 182, display systems 184 for sounds/alarms, and desktop applications 185. Legacy systems may also include Enterprise Resource Planning (ERP) and other e-enterprise systems 186, as well as Supply Chain Management (SCM) systems. The legacy systems may further include equation-based models 188 for predicting process behavior based upon physical laws.

FIG. 1A illustrates several aspects of process monitoring and/or control in accordance with embodiments of the present invention. For example, process modeling and control may be implemented utilizing a web-based architecture. Statistical methods, expert systems, and algorithms utilized to monitor and control the process need not be present at the plant site, but rather can receive information from the plant over the web. This allows the user to monitor and control process parameters from essentially any physical location, particularly given the emergence of wireless communications.

In certain embodiments of systems in accordance with the present invention, algorithms and models, and the results of application of algorithms and models to process data, may all be resident or accessible through a common application server. In this manner, the user may remotely access data and/or model results of interest, carefully controlling the bandwidth of information transmitted communicated according to available communication hardware. This server-based approach simplifies access by requiring user access to a simple browser rather than a specialized software package.

Yet another aspect of the present invention is the ability to monitor and control a process in real time. Specifically, data collected by the field level sensors may rapidly be communicated over the Internet to the server that is coordinating application of statistical methods, expert systems, and algorithms in accordance with embodiments of the present invention. These techniques can rapidly be applied to the data to produce an accurate view of the process and to provide recommendations for user action.

Still another aspect of the present invention illustrated in FIG. 1A is the ability to precisely dictate the autonomy of process monitoring and/or control from human oversight. Specifically, the system permits scalable autonomy of process monitoring and control from a human user. On one end of the scale, a human user can have an intimate role with the system, carefully monitoring incoming process data, viewing possible interpretations of the data based upon models, expert systems, and algorithms, and then based upon these possible interpretations selecting a course of action based upon his or her experience, intuition, and judgment. Alternatively, the role of the human user can be less intimate, with the human operator merely monitoring the responses undertaken by the system to control the process, and focusing upon process control only in unusual situations or even not at all.

Another aspect of the present invention is the ability to rapidly and effectively transfer key preliminary information downstream to process monitoring and modeling functions. For example, the present invention may be utilized to monitor and control an oil refining process. Key operational parameters in such a process would be affected by preliminary information such as the physical properties of incoming lots of crude oil starting material. One example of a test for measuring the physical properties of crude oil is American Society for Testing and Materials (ASTM) method number 2878, in which 22 temperatures are measured after specified amounts of fluids have been vaporized. The values of these 22 variables from lot-to-lot are likely to provide sufficient information to calculate appropriate set point values for one or more temperatures in a petroleum cracking process, such as the temperature profile for the first in a series of reactors.

Utilizing the present invention, the crude oil could be sampled and analyzed using the ASTM 2878 method at a location distant from the refinery (i.e. at the oil field or on a ship approaching the refinery), and data from the analysis communicated in real time over a web-based link downstream to the process monitoring and control functionalities. Process monitoring and control functionalities (i.e. models, algorithms, and/or knowledge based systems) could be adjusted to take into account the specific properties of the incoming crude oil, ensuring the accuracy and reliability of the determination of process state.

Another aspect of the present invention is parallel use of a wide variety of techniques for process monitoring and control, with enhanced reliability obtained by cross-validating results of these techniques. This aspect is further illustrated in connection with FIGS. 2–3A.

Figure 2:
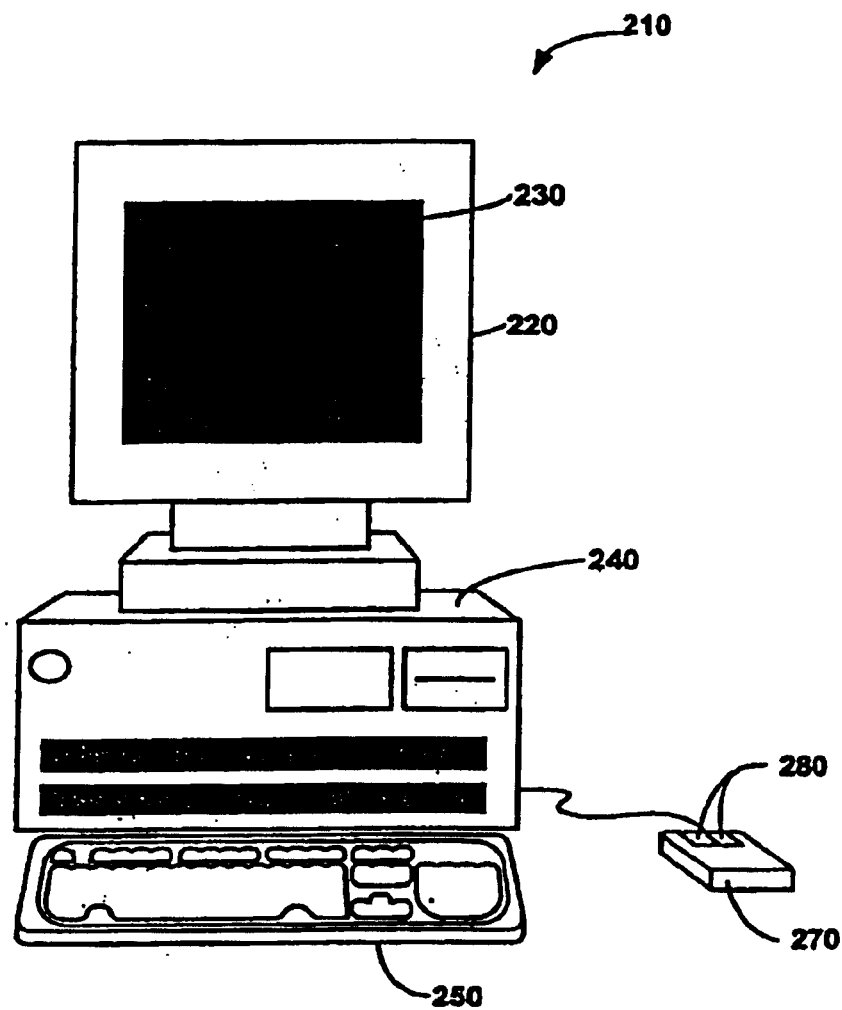
FIGS. 2 to 2A are simplified diagrams of computing device for processing information according to an embodiment of the present invention.

FIG. 2 is a simplified diagram of a computing device for processing information according to an embodiment of the present invention. This diagram is merely an example which should not limit the scope of the claims herein. One of ordinary skill in the art would recognize many other variations, modifications, and alternatives. Embodiments according to the present invention can be implemented in a single application program such as a browser, or can be implemented as multiple programs in a distributed computing environment, such as a workstation, personal computer or a remote terminal in a client server relationship.

FIG. 2 shows computer system 210 including display device 220, display screen 230, cabinet 240, keyboard 250, and mouse 270. Mouse 270 and keyboard 250 are representative "user input devices." Mouse 270 includes buttons 280 for selection of buttons on a graphical user interface device. Other examples of user input devices are a touch screen, light pen, track ball, data glove, microphone, and so forth. FIG. 2 is representative of but one type of system for embodying the present invention. It will be readily apparent to one of ordinary skill in the art that many system types and configurations are suitable for use in conjunction with the present invention. In a preferred embodiment, computer system 210 includes a Pentium™ class based computer, running Windows™ NT operating system by Microsoft Corporation. However, the apparatus is easily adapted to other operating systems and architectures by those of ordinary skill in the art without departing from the scope of the present invention.

As noted, mouse 270 can have one or more buttons such as buttons 280. Cabinet 240 houses familiar computer components such as disk drives, a processor, storage device, etc. Storage devices include, but are not limited to, disk drives, magnetic tape, solid state memory, bubble memory, etc. Cabinet 240 can include additional hardware such as input/output (I/O) interface cards for connecting computer system 210 to external devices external storage, other computers or additional peripherals, which are further described below.

Figure 2A:
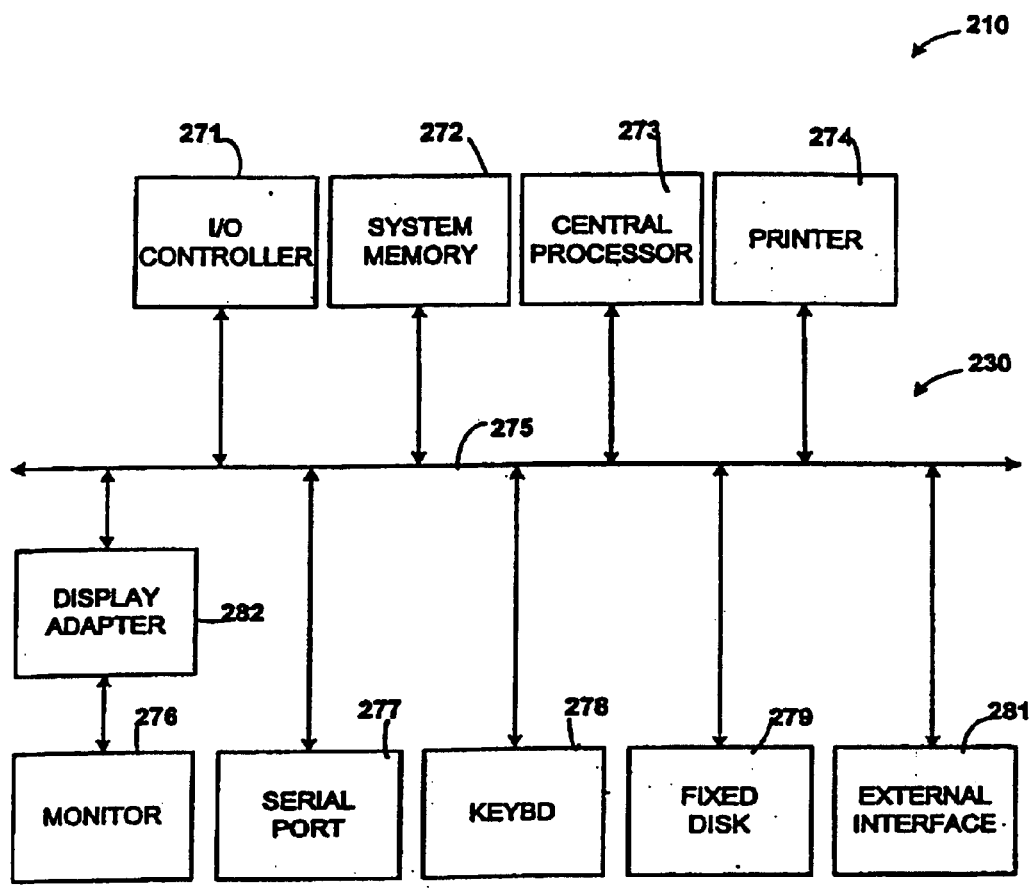

FIG. 2A is an illustration of basic subsystems in computer system 210 of FIG. 2. This diagram is merely an illustration and should not limit the scope of the claims herein. One of ordinary skill in the art will recognize other variations, modifications, and alternatives. In certain embodiments, the subsystems are interconnected via a system bus 275. Additional subsystems such as a printer 274, keyboard 278, fixed disk 279, monitor 276, which is coupled to display adapter 282, and others are shown. Peripherals and input/output (I/O) devices, which couple to I/O controller 271, can be connected to the computer system by any number of means known in the art, such as serial port 277. For example, serial port 277 can be used to connect the computer system to a modem 281, which in turn connects to a wide area network such as the Internet, a mouse input device, or a scanner. The interconnection via system bus allows central processor 273 to communicate with each subsystem and to control the execution of instructions from system memory 272 or the fixed disk 279, as well as the exchange of information between subsystems. Other arrangements of subsystems and interconnections are readily achievable by those of ordinary skill in the art. System memory, and the fixed disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

Figure 3:
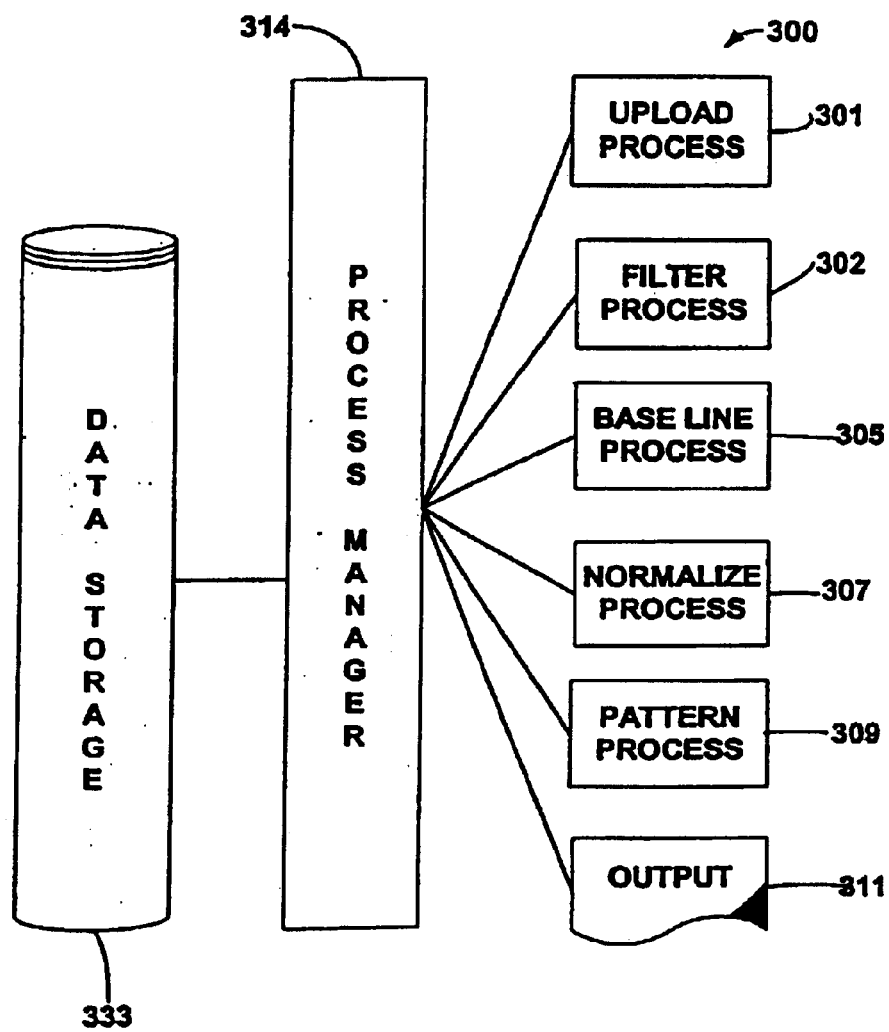
FIG. 3 is a simplified diagram of computing modules for processing information according to an embodiment of the present invention.

FIG. 3 is a simplified diagram of computing modules 300 in a system for processing information according to an embodiment of the present invention. This diagram is merely an example which should not limit the scope of the claims herein. One of ordinary skill in the art would recognize many other variations, modifications, and alternatives. As shown, the computing modules 300 include a variety of processes, which couple to a process manager 314. The processes include an upload process 301, a filter process 302, a base line process 305, a normalization process 307, a pattern process 309, and an output process 311. Other processes can also be included. A non-exclusive explanatory list of pre-processing techniques utilized by the present invention is given in TABLE 1.

Process manager also couples to data storage device 333 and oversees the processes. These processes can be implemented in software, hardware, firmware, or any combination of these in any one of the hardware devices, which were described above, as well as others.

The upload process takes data from the acquisition device and uploads them into the main process manager 314 for processing. Here, the data are in electronic form. In embodiments where the data has been stored in data storage, they are retrieved and then loaded into the process. Preferably, the data can be loaded onto workspace to a text file or loaded into a spread sheet for analysis. Next, the filter process 302 filters the data to remove any imperfections. As merely an example, data from the present data acquisition device are often accompanied with glitches, high frequency noise, and the like. Here, the signal to noise ratio is often an important consideration for pattern recognition especially when concentrations of analytes are low, exceedingly high, or not within a predefined range of windows according to some embodiments. In such cases, it is desirable to boost the signal to noise ratio using the present digital filtering technology. Examples of such filtering technology includes, but is not limited to a Zero Phase Filter, an Adaptive Exponential Moving Average Filter, and a Savitzky-Golay Filter, which will be described in more detail below.

The data go through a baseline correction process 305. Depending upon the embodiment, there can be many different ways to implement a baseline correction process. In the field of process control, one approach to establishing a baseline is stationarization. Stationarization involves the elimination of seasonal and/or batch variations from process control analysis. Stationarization is particularly useful in monitoring the time dynamics of a process. In monitoring process dynamics, the value of a single measurement, such as temperature, may not be as important as the relationship between successive temperature measurements in time.

A baseline correction process may also find response peaks, calculate $\Delta R/R$, and plot the $\Delta R/R$ verses time stamps, where the data have been captured. It also calculates maximum $\Delta R/R$ and maximum slope of $\Delta R/R$ for further processing. Baseline drift is often corrected by way of the present process. The main process manager also oversees that data traverse through the normalization process 307. In some embodiments, normalization is a row wise operation. Here, the process uses a so-called area normalization. After such normalization method, the sum of data along each row is unity. Vector length normalization is also used, where the sum of data squared of each row equals unity.

Next, the method performs a main process for classifying each of the substances according to each of their characteristics in a pattern recognition process. The pattern recognition process uses more than one algorithms, which are known, are presently being developed, or will be developed in the future. The process is used to find weighting factors for each of the characteristics to ultimately determine an identifiable pattern to uniquely identify each of the substances. That is, descriptors are provided for each of the substances. Examples of some algorithms are described throughout the present specification. Also shown is the output module 311. The output module is coupled to the process manager. The output module provides for the output of data from any one of the above processes as well as others. The output module can be coupled to one of a plurality of output devices. These devices include, among others, a printer, a display, and a network interface card. The present system can also include other modules. Depending upon the embodiment, these and other modules can be used to implement the methods according to the present invention.

The above processes are merely illustrative. The processes can be performed using computer software or hardware or a combination of hardware and software. Any of the above processes can also be separated or be combined, depending upon the embodiment. In some cases, the processes can also be changed in order without limiting the scope of the invention claimed herein. One of ordinary skill in the art would recognize many other variations, modifications, and alternatives.

Figure 3A:
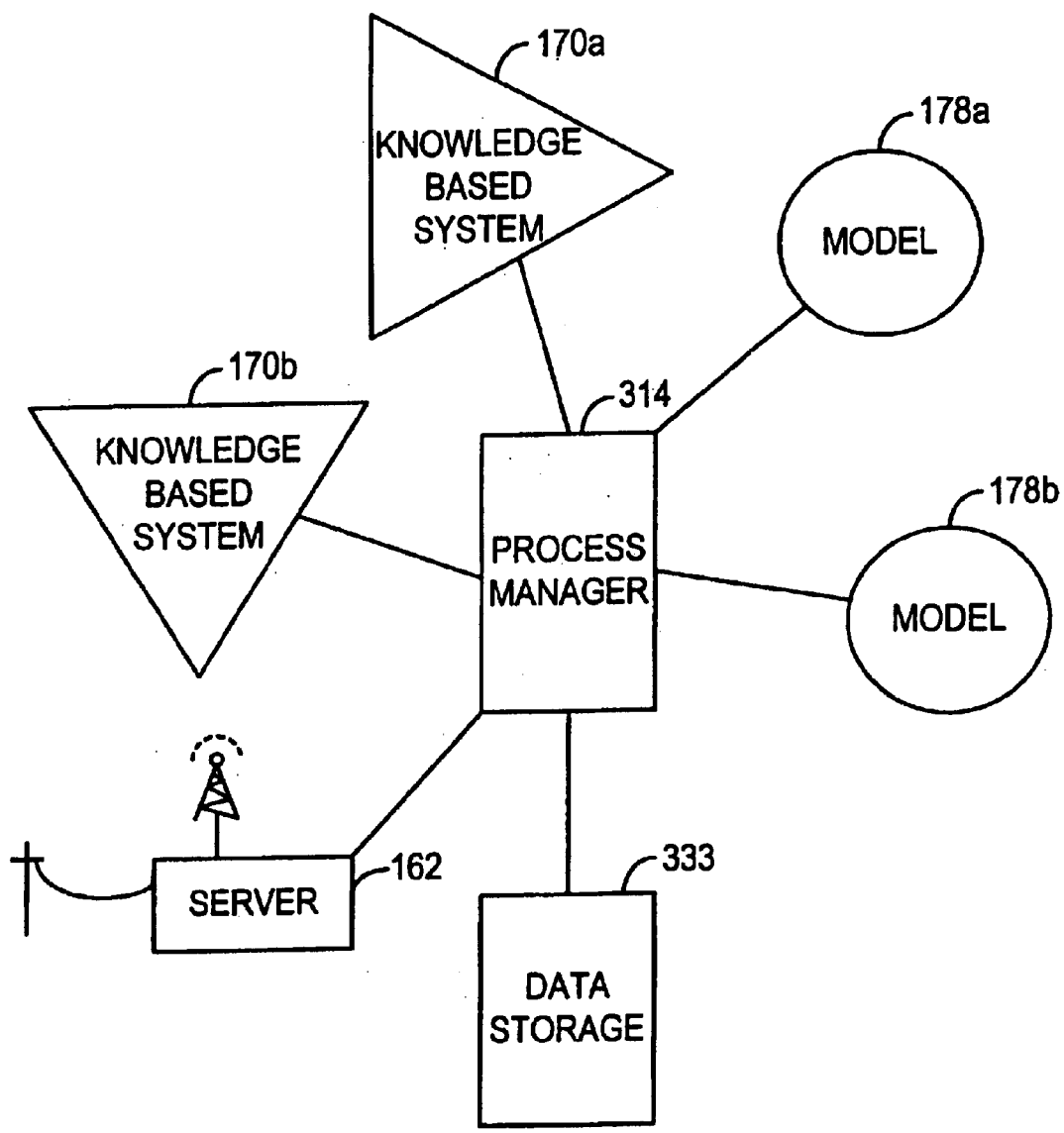
FIG. 3A is a simplified diagram showing interaction between a process manager and various analytical techniques available to monitor a process.

FIG. 3A is a simplified view of the interaction between various process control and monitoring techniques that may be employed in accordance with embodiments of the present invention. This diagram is merely an example which should not limit the scope of the claims herein. One of ordinary skill in the art would recognize many other variations, modifications, and alternatives.

As shown in FIG. 3A, server 161 receives raw process data from a plant via a net-based software interface. Once the raw data has been pre-processed, it is communicated to process manager 314. Process manager 314 may in turn access a wide variety of techniques in order to analyze and characterize the data received. Specifically, a model or algorithm may be applied to the data to identify a predicted descriptor characteristic of a state of the process. A knowledge based system may then be consulted to provide an output based upon the predicted descriptor. This output may be utilized to monitor and control the process if desired.

As shown in FIG. 3A, process manager 314 is communication with database 316 and with models 178a and 178b. Models 178a and 178b attempt to simulate the behavior of the process being controlled, thereby allowing prediction of future behavior. A library of the different categories of algorithms used to form models can be stored in data storage device 333 so as to be accessible to process manager 314. Models 178a and 178b may be constructed upon a variety of fundamental principles.

One approach is to model the process based upon data received from operation of a similar process, which may or may not be located in the same plant. This aspect of the present invention is particularly attractive given the recent trend of standardizing industrial plants, particularly for newly-constructed batch processes. Such standardized industrial plants may feature identical equipment and/or instrumentation, such that a model built to predict the behavior of one plant can be used to evaluate the health of another plant. For example, the manager of a semiconductor fabrication plant in the United States may compare operation of a particular type of tool with data from an identical tool operating in a second semiconductor fabrication plant located in Malaysia. This comparison may occur in real time, or may utilize archived data from past operation of the tool in the second semiconductor fabrication plant. Moreover, the processes or tools to be compared need not be identical, but may be similar enough that comparison between them will provide information probative of the state of the process.

Another type of model may be based upon mathematical equations derived from physical laws. Examples of such physical laws include mass balance, heat balance, energy balance, linear momentum balance, angular momentum balance, entropy and a wide variety of other physical models. The mathematical expressions representing these physical laws may be stored in data storage device 333 so as to be accessible for process analysis.

Yet another type of model is based upon algorithms such as statistical techniques. A non-exclusive, explanatory list of univariate techniques which may be utilized by the present invention is presented in TABLES 2A and 2B. Another type of model is based upon multivariate statistical techniques such as principal component analysis (PCA). A non-exclusive, explanatory list of multivariate techniques that may be utilized by the present invention is presented in TABLE 3. Still other model types may rely on a neural-based approach, examples of which include but are not limited to neural networks and genetic selection algorithms.

Other models may themselves be a collection of component models. One significant example of this model type is the System Coherence Rendering Exception Analysis for Maintenance (SCREAM) model currently being developed by the Jet Propulsion Laboratory of Pasadena, Calif. Originally developed to monitor and control satellites, SCREAM is a collection of models that conduct time-series analysis to provide intelligence for system self-analysis. A detailed listing of the techniques utilized by SCREAM is provided in TABLE 4.

One valuable aspect of SCREAM is recognition of process lifecycles. Many process dynamics exhibit a characteristic life cycle. For example, a given process may exhibit non-linear behavior in an opening stage, followed by more predictable linear or cyclical phases in a mature stage, and then conclude with a return to non-linear behavior in a concluding stage. SCREAM is especially suited not only to recognizing these expected process phases, but also to recognizing undesirable deviation from these expected phases.

Another valuable aspect of SCREAM is the ability to receive and analyze symbolic data. Symbolic data are typically data not in the form of an analog signal, and hence not readily susceptible to quantitation. Examples of symbolic data typically include labels and digital/integer inputs or outputs. Symbolic data is generally visual in nature, for example a position of a handle, a color of a smoke plume, or the general demeanor of a patient (in the case of a medical diagnostic process).

SCREAM uses symbolic inputs to determine the state of the process. For example, positions of on/off valves may be communicated as a digital signal using '0' to represent the open position and '1' to represent the closed position, or vice versa. Based on the valve positions, SCREAM may identify the physical state of the process. As valve positions change, the process may enter a different state.

Once a model has been applied to process data to produce a predicted descriptor characteristic of process state, a knowledge based system is consulted to produce an output for process monitoring and/or control purposes. As shown in FIG. 3A, process manager 314 is communication with first and second knowledge based systems 170a and 170b.

Examples of such knowledge based systems include self-learning systems, expert systems, and logic systems, as well as so-called "fuzzy" variants of each of these types of systems. An expert system is commonly defined as a computer system programmed to imitate problem-solving procedures of a human expert. For example, in a medical system the user might enter data like the patient's symptoms, lab reports, etc., and derive from the computer a possible diagnosis. The success of an expert system depends on the quality of the data provided to the computer, and the rules the computer has been programmed with for making deductions from that data.

An expert system may be utilized in conjunction with supervised learning for purposes of process control. For example, where specific measures have previously successfully been implemented to correct a process anomaly, these measures may serve as a training set and be utilized as a basis for addressing similar future problems.

While the above discussion has proposed analysis of process data through application of a single model followed by consultation with a single knowledge based system to obtain an output, the present invention is not limited to this embodiment. For example, as shown in FIG. 3A process manager 314 is in communication with first model 178a and with a second model 178b. These models may be applied in parallel to obtain predicted descriptors. These independently generated predicted descriptors can be cross-referenced to validate the accuracy and reliability of process control.

For example, where application of a first model produces a first predicted descriptor in agreement with a second predicted descriptor, the process state assessment is confirmed and the output may reflect a degree of certainty as to the state of the process. This reflection may be in the form of the content of the output (i.e. a process fault is definitely indicated) and/or in the form of the output (i.e. a pager is activated to immediately alert the human user to a high priority issue).

However, where first and second predicted descriptors resulting from application of different models are not in agreement, a different output may be produced that reflects uncertainty in process state. This reflection may be in the form of the content of the output (i.e. a process fault may be indicated) and/or in the form of the output (i.e. only an email is sent to the human user to indicate a lower priority issue.)

As an alternative approach, a second knowledge based system may be consulted to resolve a conflict in predicted descriptors from different models. An output based upon the descriptor chosen by the second knowledge based system would then produced.

Figure 3B:
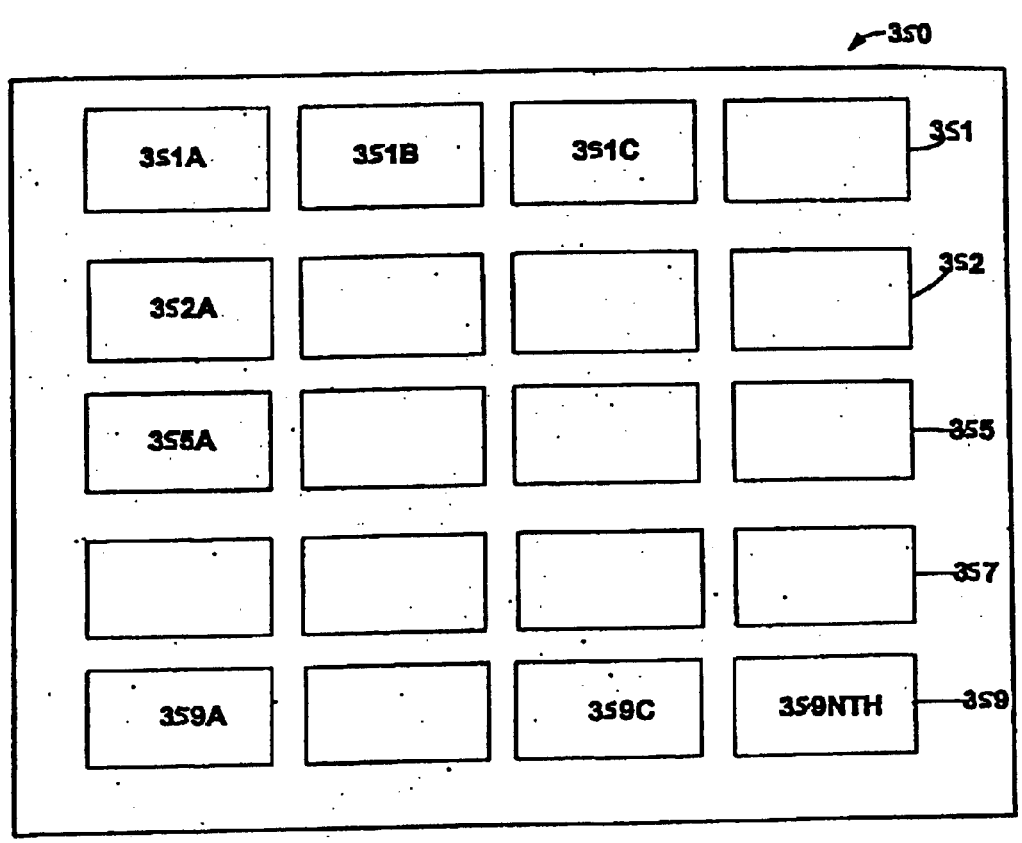
FIG. 3B is a simplified diagram of a capturing device for processing information according to an embodiment of the present invention.

A wide variety of structures may be utilized to detect process characteristics and/or modify operational process parameters. Data may be received from a system in a variety of formats, such as text, still image, moving video images, and sound. FIG. 3B is a simplified diagram of a top-view 300 of an information capturing device according to an embodiment of the present invention. This diagram is merely an example which should not limit the scope of the claims herein. One of ordinary skill in the art would recognize many other variations, modifications, and alternatives.

As shown in FIG. 3B, the top view diagram includes an array of sensors, 351A, 351B, 301C, 359nth. The array is arranged in rows 351, 352, 355, 357, 359 and columns, which are normal to each other. Each of the sensors has an exposed surface for capturing, for example, olfactory information from fluids, e.g., liquid and/or vapor. The diagram shown is merely an example of an information capturing device. Details of such information capturing device are provided in U.S. application Ser. No. 09/518,179, which is now U.S. Pat. No. 6,422,061, commonly assigned, and hereby incorporated by reference for all purposes. Other devices can be made by companies such as Aromascan (now Osmetech), Hewlett Packard, Alpha-MOS, or other companies.

Although the above has been described in terms of a capturing device for fluids to including liquids and/or vapors, there are many other types of capturing devices. For example, other types of information capturing devices for converting an intrinsic or extrinsic characteristic to a measurable parameter can be used. These information capturing devices include, among others, pH monitors, temperature measurement devices, humidity devices, pressure sensors, flow measurement devices, chemical detectors, velocity measurement devices, weighting scales, length measurement devices, color identification, and other devices. These devices can provide an electrical output that corresponds to measurable parameters such as pH, temperature, humidity, pressure, flow, chemical types, velocity, weight, height, length, and size.

In some embodiments, the present invention can be used with at least two sensor arrays. The first array of sensors comprises at least two sensors (e.g., three, four, hundreds, thousands, millions or even billions) capable of producing a first response in the presence of a chemical stimulus. Suitable chemical stimuli capable of detection include, but are not limited to, a vapor, a gas, a liquid, a solid, an odor or mixtures thereof. This aspect of the device comprises an electronic nose. Suitable sensors comprising the first array of sensors include, but are not limited to conducting/nonconducting regions sensor, a SAW sensor, a quartz microbalance sensor, a conductive composite sensor, a chemiresistor, a metal oxide gas sensor, an organic gas sensor, a MOSFET, a piezoelectric device, an infrared sensor, a sintered metal oxide sensor, a Pd-gate MOSFET, a metal FET structure, a electrochemical cell, a conducting polymer sensor, a catalytic gas sensor, an organic semiconducting gas sensor, a solid electrolyte gas sensors, and a piezoelectric quartz crystal sensor. It will be apparent to those of skill in the art that the electronic nose array can be comprises of combinations of the foregoing sensors. A second sensor can be a single sensor or an array of sensors capable of producing a second response in the presence of physical stimuli. The physical detection sensors detect physical stimuli. Suitable physical stimuli include, but are not limited to, thermal stimuli, radiation stimuli, mechanical stimuli, pressure, visual, magnetic stimuli, and electrical stimuli.

Thermal sensors can detect stimuli which include, but are not limited to, temperature, heat, heat flow, entropy, heat capacity, etc. Radiation sensors can detect stimuli that include, but are not limited to, gamma rays, X-rays, ultraviolet rays, visible, infrared, microwaves and radio waves. Mechanical sensors can detect stimuli which include, but are not limited to, displacement, velocity, acceleration, force, torque, pressure, mass, flow, acoustic wavelength, and amplitude. Magnetic sensors can detect stimuli that include, but are not limited to, magnetic field, flux, magnetic moment, magnetization, and magnetic permeability. Electrical sensors can detect stimuli which include, but are not limited to, charge, current, voltage, resistance, conductance, capacitance, inductance, dielectric permittivity, polarization and frequency.

In certain embodiments, thermal sensors are suitable for use in the present invention that include, but are not limited to, thermocouples, such as a semiconducting thermocouples, noise thermometry, thermoswitches, thermistors, metal thermoresistors, semiconducting thermoresistors, thermodiodes, thermotransistors, calorimeters, thermometers, indicators, and fiber optics.

In other embodiments, various radiation sensors suitable for use in the present invention include, but are not limited to, nuclear radiation microsensors, such as scintillation counters and solid state detectors, ultra-violet, visible and near infrared radiation microsensors, such as photoconductive cells, photodiodes, phototransistors, infrared radiation microsensors, such as photoconductive IR sensors and pyroelectric sensors.

In certain other embodiments, various mechanical sensors are suitable for use in the present invention and include, but are not limited to, displacement microsensors, capacitive and inductive displacement sensors, optical displacement sensors, ultrasonic displacement sensors, pyroelectric, velocity and flow microsensors, transistor flow microsensors, acceleration microsensors, piezoresistive microaccelerometers, force, pressure and strain microsensors, and piezoelectric crystal sensors.

In certain other embodiments, various chemical or biochemical sensors are suitable for use in the present invention and include, but are not limited to, metal oxide gas sensors, such as tin oxide gas sensors, organic gas sensors, chemocapacitors, chemodiodes, such as inorganic Schottky device, metal oxide field effect transistor (MOSFET), piezoelectric devices, ion selective FET for pH sensors, polymeric humidity sensors, electrochemical cell sensors, pellistors gas sensors, piezoelectric or surface acoustical wave sensors, infrared sensors, surface plasmon sensors, and fiber optical sensors.

Various other sensors suitable for use in the present invention include, but are not limited to, sintered metal oxide sensors, phthalocyanine sensors, membranes, Pd-gate MOSFET, electrochemical cells, conducting polymer sensors, lipid coating sensors and metal FET structures. In certain preferred embodiments, the sensors include, but are not limited to, metal oxide sensors such as a Tuguchi gas sensors, catalytic gas sensors, organic semiconducting gas sensors, solid electrolyte gas sensors, piezoelectric quartz crystal sensors, fiber optic probes, a micro-electro-mechanical system device, a micro-opto-electro-mechanical system device and Langmuir-Blodgett films.

Additionally, the above description in terms of specific hardware is merely for illustration. It would be recognized that the functionality of the hardware be combined or even separated with hardware elements and/or software. The functionality can also be made in the form of software, which can be predominantly software or a combination of hardware and software. One of ordinary skill in the art would recognize many variations, alternatives, and modifications. Details of methods according to the present invention are provided below.

A method of controlling a process according to one embodiment of the present invention may be briefly outlined as follows:

1. acquire initial data from a source at a first time;
2. convert the initial data into electronic form;
3. load the initial data into a first memory;
4. retrieve the initial data from the first memory;
5. acquire subsequent data from the source at a second time;
6. assign a first descriptor to the initial data and a second descriptor to the subsequent data;
7. construct a model based on the initial data and the first descriptor and on the subsequent data and the second descriptor;
8. store the model in a second memory;
9. acquire data from a process;
10. apply the model to the data to identify a predicted descriptor characteristic of a state of the process; and
11. consult a knowledge based system and provide an output based upon the predicted descriptor.

The above sequence of steps is merely an example of a way to monitor a process according to one embodiment of the present method and system. Details of these steps are provided below, but it is to be understood that one of ordinary skill in the art would recognize many other variations, modifications, and alternatives.

The first step listed above is acquisition of initial data from a source at a first time. While data is to be acquired from at least one source, in many embodiments data will be acquired from a plurality of sources in contact with the process, for example the field mounted devices illustrated and described in conjunction with FIG. 1A.

The second, third, and fourth listed steps are respectively, conversion of the initial data into electronic form, storage of the electronic data, and retrieval of the stored data. Structures for performing these steps are well known in the art.

The fifth step is to acquire subsequent data from the source at a second time. This step provides the system with exemplary information about changes in the process between the first time and the second time. While in its most general form the present invention samples data from two time periods, in practice it is expected that data from many times will be acquired.

The sixth step is to assign a first descriptor to the initial data and a second descriptor to the subsequent data. The descriptor characterizes the state of the process in relation to the data. Examples of possible descriptors include "normal process operation", "process start-up, "process shut-down", "over heat condition", etc.

The seventh step is to construct a model of process behavior based upon the initial and subsequent data and the first and second descriptors. While at least one model is constructed, in practical implementation of the present invention many types of models based upon different principles may be constructed utilizing approaches such as univariate statistical techniques, time series analysis, and multivariate statistical techniques such as PCA, CDA, and PLS, as are known to one of ordinary skill in the art.

Once the model has been constructed, the eighth step is to store the model in a second memory. In the ninth step, the stored model is applied to a set of data acquired from the process. This data set can may represent real time parameters of the process that is to be monitored and/or controlled.

In the tenth step, the model is applied to the third data set to produce a predicted descriptor that characterizes the state of the process. This predicted descriptor is output by the model based upon the construction of the model, utilizing the initial data, the subsequent data, the first descriptor, and the second descriptor.

Based upon the predicted descriptor predicted by application of the model, in the eleventh and final step a knowledge based system is referenced and an output is provided. This output may be provided to an internal entity such as a process control device, or to an external entity such as associated s supply chain management system (SCM), or to both internal and external systems. For example, where the third descriptor predicted by the model indicates failure of a pump, an output in the form of a purchase order with the relevant replacement pump part number could be communicated to the SCM. Alternatively or in conjunction with notifying an SCM system, the output could be directed to an entity such as a pager or voicemail, thereby communicating the state of the process to a human operator for monitoring and/or possible intervention.

The above listed steps represent only a specific example of a method for monitoring and controlling a process in accordance with an embodiment of the present invention. One of ordinary skill in the art would recognize many variations, alternatives, and modifications.

For example, many models useful for predicting process behavior may be created utilizing univariate and multivariate statistical techniques applied to previously collected data. Alternatively however, useful models of process behavior may also be constructed from mathematical expressions of physical or natural laws. Where such a physical model is employed, rules implicit in the model may govern predicted behavior of the system over time. Prior collection of data may therefore not be necessary to create the model, and the model may be directly applied to data acquired from the process.

In yet another possible embodiment, data from the process may be analyzed in parallel by more than one model. In embodiments of the present invention where multiple models are being used to predict process behavior, the descriptor output by each model may be compared. A difference in the descriptor predicted by the various models could be resolved through application of a knowledge based system such as an expert system.

A method using digital information for populating a database for identification or classification purposes according to the present invention may be briefly outlined as follows:

1. Acquire data, where the data are for one or more substances, each of the substances having a plurality of distinct characteristics;
2. Convert data into electronic form;
3. Provide data in electronic form (e.g., text, normalized data from an array of sensors) for classification or identification;
4. Load the data into a first memory by a computing device;
5. Retrieve the data from the first memory;
6. Remove first noise levels from the data using one or more filters;
7. Correct data to a base line for one or more variables such as drift, temperature, humidity, etc.;
8. Normalize data using a base line;
9. Reject one or more of the plurality of distinct characteristics from the data;
10. Perform one or more pattern recognition methods on the data;
11. Classify the one or more substances based upon the pattern recognition methods to form multiple classes that each corresponds to a different substance;
12. Determine optimized (or best general fit) pattern recognition method via cross validation process;
13. Store the classified substances into a second memory for further analysis; and
14. Perform other steps, as desirable.

The above sequence of steps is merely an example of a way to teach or train the present method and system. The present example takes more than one different substance, where each substance has a plurality of characteristics, which are capable of being detected by sensors. Each of these characteristics are measured, and then fed into the present method to create a training set. The method includes a variety of data processing techniques to provide the training set. Depending upon the embodiment, some of the steps may be separated even further or combined. Details of these steps are provided below according to Figs.

Figure 4A:
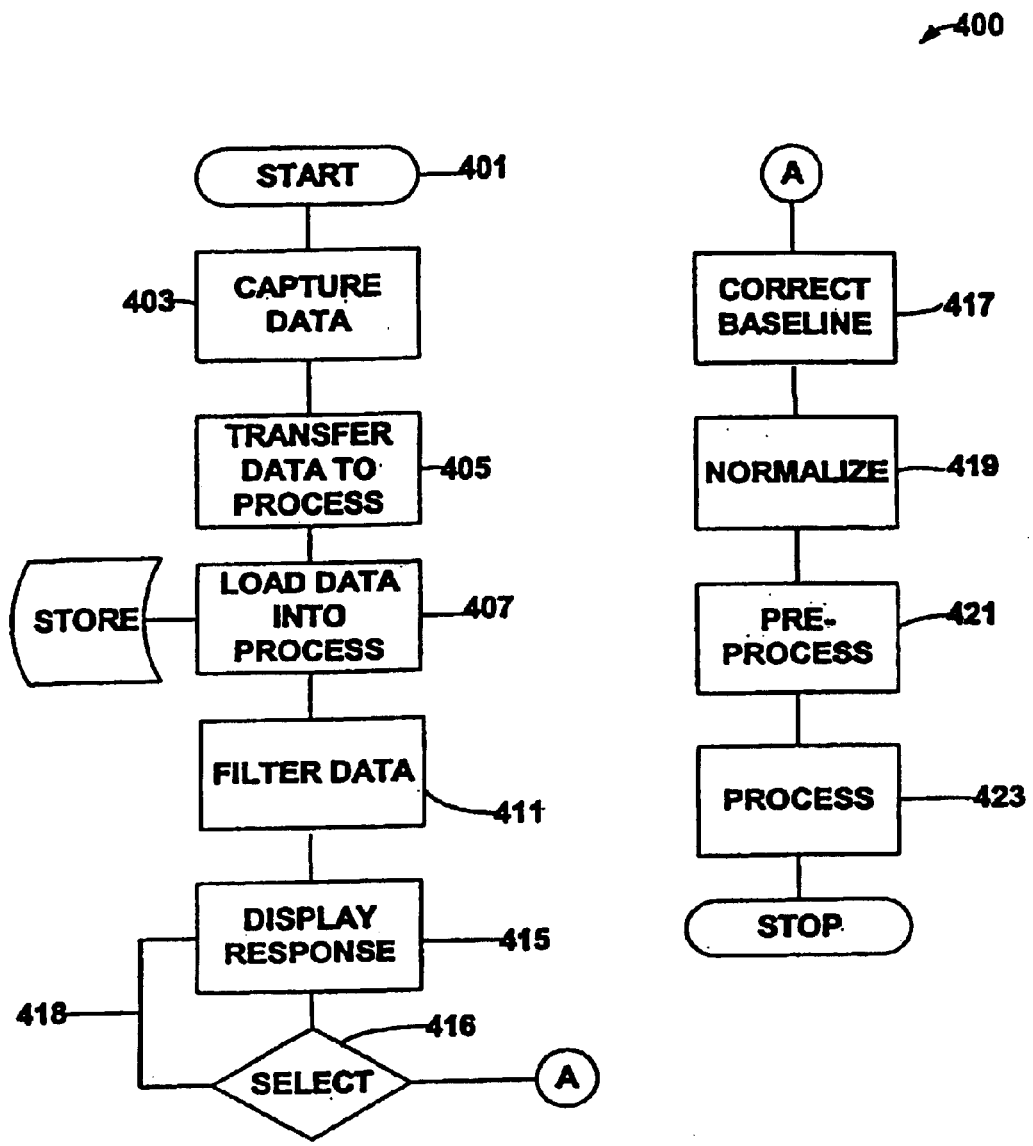
FIGS. 4A to 4E are simplified diagrams of methods according to embodiments of the present invention.
Figure 4B:
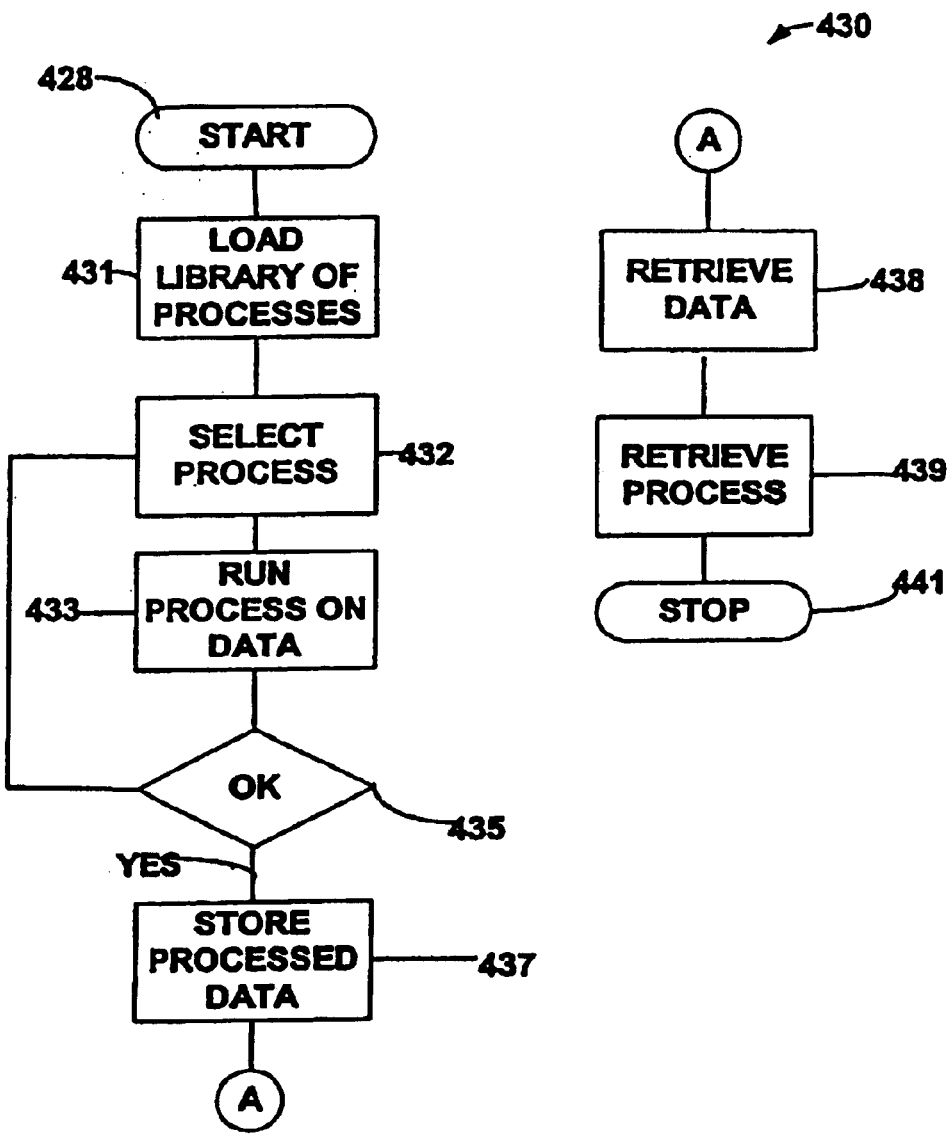
Figure 4C:
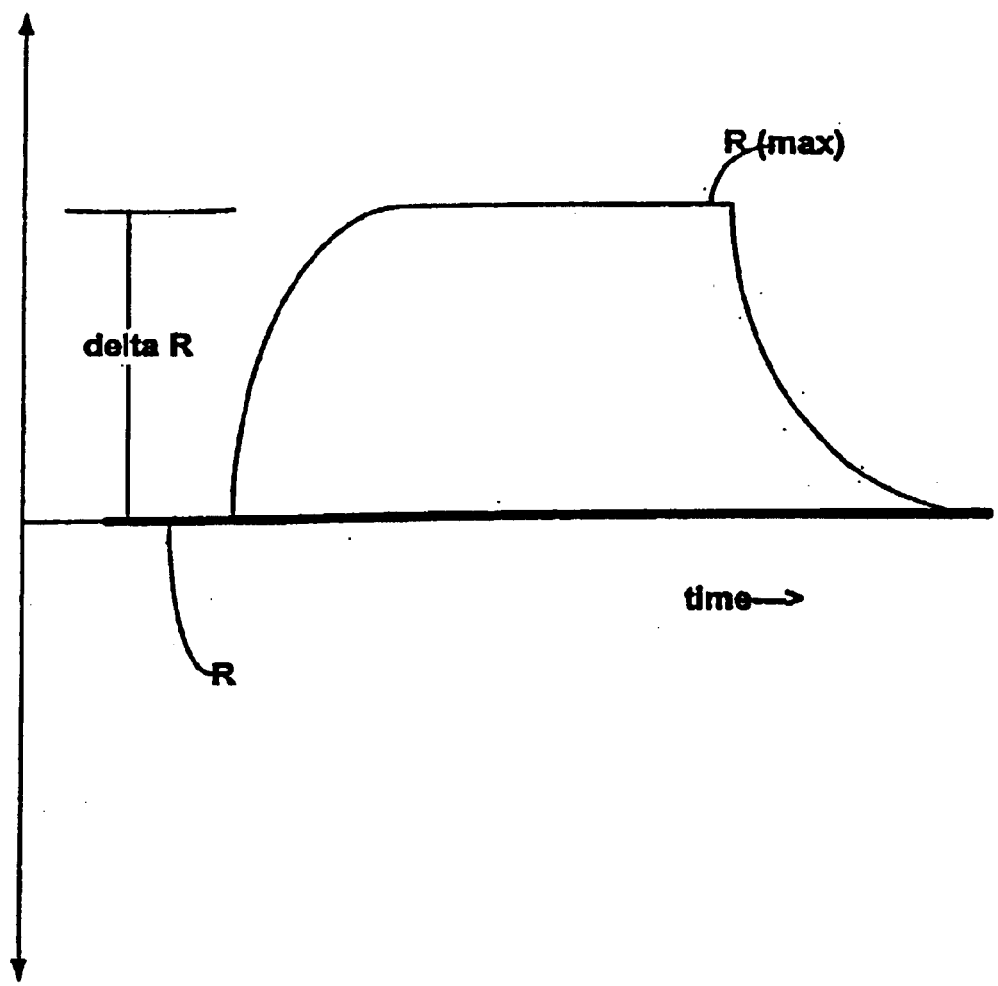

FIGS. 4A to 4C are simplified diagrams of methods 400 according to embodiments of the present invention. These diagrams are merely examples which should not limit the scope of the claims herein. One of ordinary skill in the art would recognize many other variations, modifications, and alternatives. As shown, the present method begins at start, step 401. The method then captures data (step 403) from a data acquisition device. The data acquisition device can be any suitable device for capturing either intrinsic or extrinsic information from a substance. As merely an example, the present method uses a data acquisition device for capturing olfactory information. The device has a plurality of sensors, which convert a scent or olfaction print into an artificial or electronic print. In a specific embodiment, such data acquisition device is disclosed in WO 99/ 47905, commonly assigned and hereby incorporated by reference for all purposes. Those of skill in the art will know of other devices including other electronic noses suitable for use in the present invention. In a specific embodiment, the present invention captures olfactory information from a plurality of different liquids, e.g., isopropyl alcohol, water, toluene. The olfactory information from each of the different liquids is characterized by a plurality of measurable characteristics, which are acquired by the acquisition device. Each different liquid including the plurality of measurable characteristics can be converted into an electronic data form for use according to the present invention. Some of these characteristics were previously described, but can also include others.

Next, the method transfers the electronic data, now in electronic form, to a computer aided process (step 405). The computer aided process may be automatic and/or semiautomatic depending upon the application. The computer aided process can store the data into memory, which is coupled to a processor. When the data is ready for use, the data is loaded into the process, step 407. In embodiments where the data has been stored, they are retrieved and then loaded into the process. Preferably, the data can be loaded onto workspace to a text file or loaded into a spread sheet for analysis. Here, the data can be loaded continuously and automatically, or be loaded manually, or be loaded and monitored continuously to provide real time analysis.

The method filters the data (step 411) to remove any imperfections. As merely an example, data from the present data acquisition device are often accompanied with glitches, high frequency noise, and the like. Here, the signal to noise ratio is often an important consideration for pattern recognition especially when concentrations of analytes are low, exceedingly high, or not within a predefined range of windows according to some embodiments. In such cases, it is desirable to boost the signal to noise ratio using the present digital filtering technology. Examples of such filtering technology includes, but is not limited to a Zero Phase Filter, an Adaptive Exponential Moving Average Filter, and a Savitzky-Golay Filter, which will be described in more detail below.

Optionally, the filtered responses can be displayed, step (415). Here, the present method performs more than one of the filtering techniques to determine which one provides better results. By way of the present method, it is possible to view the detail of data preprocessing. The method displays outputs (step 415) for each of the sensors, where signal to noise levels can be visually examined. Alternatively, analytical techniques can be used to determine which of the filters worked best. Each of the filters are used on the data, step 416 via branch 418. Once the desired filter has been selected, the present method goes to the next step.

The method performs a baseline correction step (step 417). Depending upon the embodiment, there can be many different ways to implement a baseline correction method. Here, the baseline correction method finds response peaks, calculates $\Delta R/R$, and plots the $\Delta R/R$ verses time stamps, where the data have been captured. It also calculates maximum $\Delta R/R$ and maximum slope of $\Delta R/R$ for further processing. Baseline drift is often corrected by way of the present step. Once baseline drift has been corrected, the present method undergoes a normalization process, although other processes can also be used. Here, $\Delta R/R$ can be determined using one of a plurality of methods, which are known, if any, or developed according to the present invention.

As merely an example, FIG. 4C illustrates a simplified plot of a signal and various components used in the calculation of $\Delta R/R$, which can be used depending upon the embodiment. This diagram is merely an illustration, which should not limit the scope of the claims herein. One of ordinary skill in the art would recognize many other variations, modifications, and alternatives. As shown, the diagram shows a pulse, which is plotted along a time axis, which intersects a voltage, for example. The diagram includes a ΔR (i.e., delta R), which is defined between R and R(max). As merely an example, ΔR/R is defined by the following expression:

$$\Delta R/R = (R(\max) - R(0))/R$$

where

ΔR is defined by the average difference between a base line value R(0) and R(max);

R (max) is defined by a maximum value of R;

R(0) is defined by an initial value of R; and

R is defined as a variable or electrical measurement of resistance from a sensor, for example.

This expression is merely an example, the term ΔR/R could be defined by a variety of other relationships. Here, ΔR/R has been selected in a manner to provide an improved signal to noise ratio for the signals from the sensor, for example. There can be many other relationships that define ΔR/R, which may be a relative relation in another manner. Alternatively, ΔR/R could be an absolute relationship or a combination of a relative relationship and an absolute relationship. Of course, one of ordinary skill in the art would provide many other variations, alternatives, and modifications.

As noted, the method includes a normalization step, step 419. In some embodiments, normalization is a row wise operation. Here, the method uses a so-called area normalization. After such normalization method, the sum of data along each row is unity. Vector length normalization is also used, where the sum of data squared of each row equals unity.

As shown by step 421, the method may next perform certain preprocessing techniques. Preprocessing may be employed to eliminate the effect on the data of inclusion of the mean value in data analysis, or of the use of particular units of measurement, or of large to differences in the scale of the different data types received. Examples of such preprocessing techniques include mean-centering and auto-scaling. Preprocessing techniques utilized for other purposes include for example, smoothing, outlier rejection, drift monitoring, and others. Some of these techniques will be described later. Once preprocessing has been completed, the method performs a detailed processing technique.

Next, the method performs a main process for classifying each of the substances according to each of their characteristics, step 423. Here, the present method performs a pattern recognition process, such as the one illustrated by the simplified diagram 430 in FIG. 4B. This diagram is merely an example, which should not limit the scope of the claims herein. One of ordinary skill in the art would recognize many other variations, modifications, and alternatives.

As shown, the method 430 begins with start, step 428. The method queries a library, including a plurality of pattern recognition algorithms, and loads (step 431) one or more of the algorithms in memory to be used. The method selects the one algorithm, step 432, and runs the data through the algorithm, step 433. In a specific embodiment, the pattern recognition process uses more than one algorithms, which are known, are presently being developed, or will be developed in the future. The process is used to find weighting factors based upon descriptors for each of the characteristics to ultimately determine an identifiable pattern to describe the activity of a process. The present method runs the data, which have been preprocessed, through each of the algorithms.

| | |
|---|---|
| PCA | Principal Components Analysis |
| HCA | Hierarchical Cluster Analysis |
| KNN CV | K Nearest Neighbor Cross Validation |
| KNN Prd | K Nearest Neighbor Prediction |
| SIMCA CV | SIMCA Cross Validation |
| SIMCA Prd | SIMCA Prediction |
| Canon CV | Canonical Discriminant Analysis and Cross Validation |
| Canon Prd | Canonical Discriminant Prediction |
| Fisher CV | Fisher Linear Discriminant Analysis and Cross Validation |
| Fisher Prd | Fisher Linear Discriminant Prediction |
| SCREAM | System Coherence Rendering Exception Analysis for Maintenance |

PCA and HCA, are unsupervised learning methods. They can be used for investigating training data and finding the answers of:

I. How many principal components will cover the most of variances?

II. How many principal components you have to choose?

III. How do the loading plots look?

IV. How do the score plots look?

V. How are the scores separated among the classes?

VI. How are the clusters grouped in their classes? VII. How much are the distances among the clusters?

The other four algorithms, KNN CV, SIMCA CV, Canon CV, and Fisher CV, are supervised learning methods used when the goal is to construct models to be used to predict the future behavior of a process. These algorithms will perform cross validation, find the optimum number of parameters, and build models. SCREAM is actually a combination of several techniques employing time series analysis.

Once the data has been run through the first algorithm, for example, the method repeats through a branch (step 435) to step 432 to another process. This process is repeated until one or more of the algorithms have been used to analyze the data. The process is repeated to try to find a desirable algorithm that provides good results with a specific preprocessing technique used to prepare the data. If all of the desirable algorithms have been used, the method stores (or has previously stored) (step 437) each of the results of the processes on the data in memory.

In a specific embodiment, the present invention provides a cross-validation technique. Here, an auto (or automatic) cross-validation algorithm can be implemented. The present technique uses cross-validation, which is an operation process used to validate models built with chemometrics algorithms based on training data set. During the process, the training data set is divided into calibration and validation subsets. A model is built with the calibration subset and is used to predict the validation subset. The training data set can be divided into calibration and validation subsets called "leave-one-out", i.e., take one sample out from each class to build a validation subset and use the rest samples to build a calibration subset. This process can be repeated using different subset until every sample in the training set has been included in one validation subset. The predicted results are stored in an array. Then, the correct prediction percentages (CPP) are calculated, and are used to validate the performance of the model.

According to the present method, a cross-validation with one training data set can be applied to generally all the models built with different algorithms, such as K-Nearest Neighbor (KNN), SIMCA, Canonical Discriminant Analysis, Fisher Linear Discriminant Analysis, and SCREAM respectively. The results of correct prediction percentages (CPP) show the performance differences with the same training data set but with different algorithms. Therefore, one can pick up the best algorithm according to the embodiment.

During the model building, there are several parameters and options to choice. To build the best model with one algorithm, cross-validation is also used to find the optimum parameters and options. For example, in the process of building a KNN model, cross-validation is used to validate the models built with different number of K, different scaling options, e.g., mean-centering or auto-scaling, and other options, e.g., with PCA or without PCA, to find out the optimum combination of K and other options. In a preferred embodiment, auto-cross-validation can be implemented using a single push-button or two push buttons for ease in use. It will automatically run the processes mentioned above over all the (or any selected) algorithms with the training data set to find out the optimum combination of parameters, scaling options and algorithms.

The method also performs additional steps of retrieving data, step 438, and retrieving the process or algorithm, step 439. As noted, each of the processes can form a descriptor for each sample in the training set. Each of these descriptors can be stored and retrieved. Here, the method stores the raw data, the preprocessed data, the descriptors, and the algorithm used for the method for each algorithm used according to the present invention. The method stops, step 441.

The above sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives.

An alternative method according to the present invention is briefly outlined as follows:

1. Acquire raw data in voltages;
2. Check base line voltages;
3. Filter;
4. Calculate ΔR/R
5. Determine Training set?
6. If yes, find samples (may repeat process);
7. Determine outlier?;
8. If yes, remove bad data using, for example PCA;
9. Find important sensors using importance index (individual filtering process);
10. Normalize;
11. Find appropriate pattering recognition process;
12. Run each pattern recognition process;
13. Display (optional);
14. Find best fit out of each pattern recognition process;
15. Compare against confidence factor (if less than a certain number, this does not work);
16. Perform other steps, as required.

The above sequence of steps is merely an example of a way to teach or train the present method and system according to an alternative embodiment. The present example takes more than one different substance, where each substance has a plurality of characteristics, which are capable of being detected by sensors or other sensing devices. Each of these characteristics are measured, and then fed into the present method to create a training set. The method includes a variety of data processing techniques to provide the training set. Depending upon the embodiment, some of the steps may be separated even further or combined. Details of these steps are provided below according to the Figs.

Figure 4D:
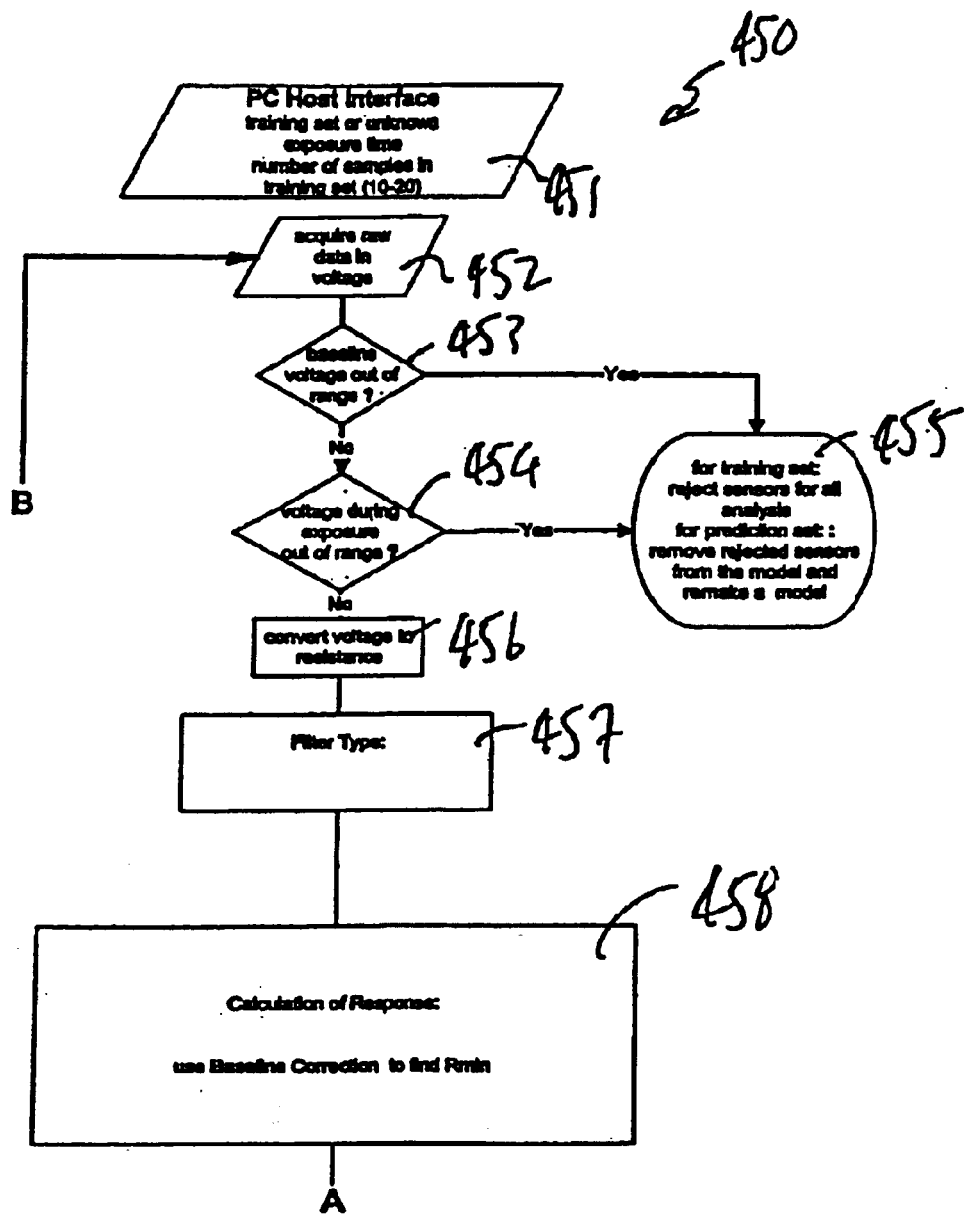
Figure 4E:
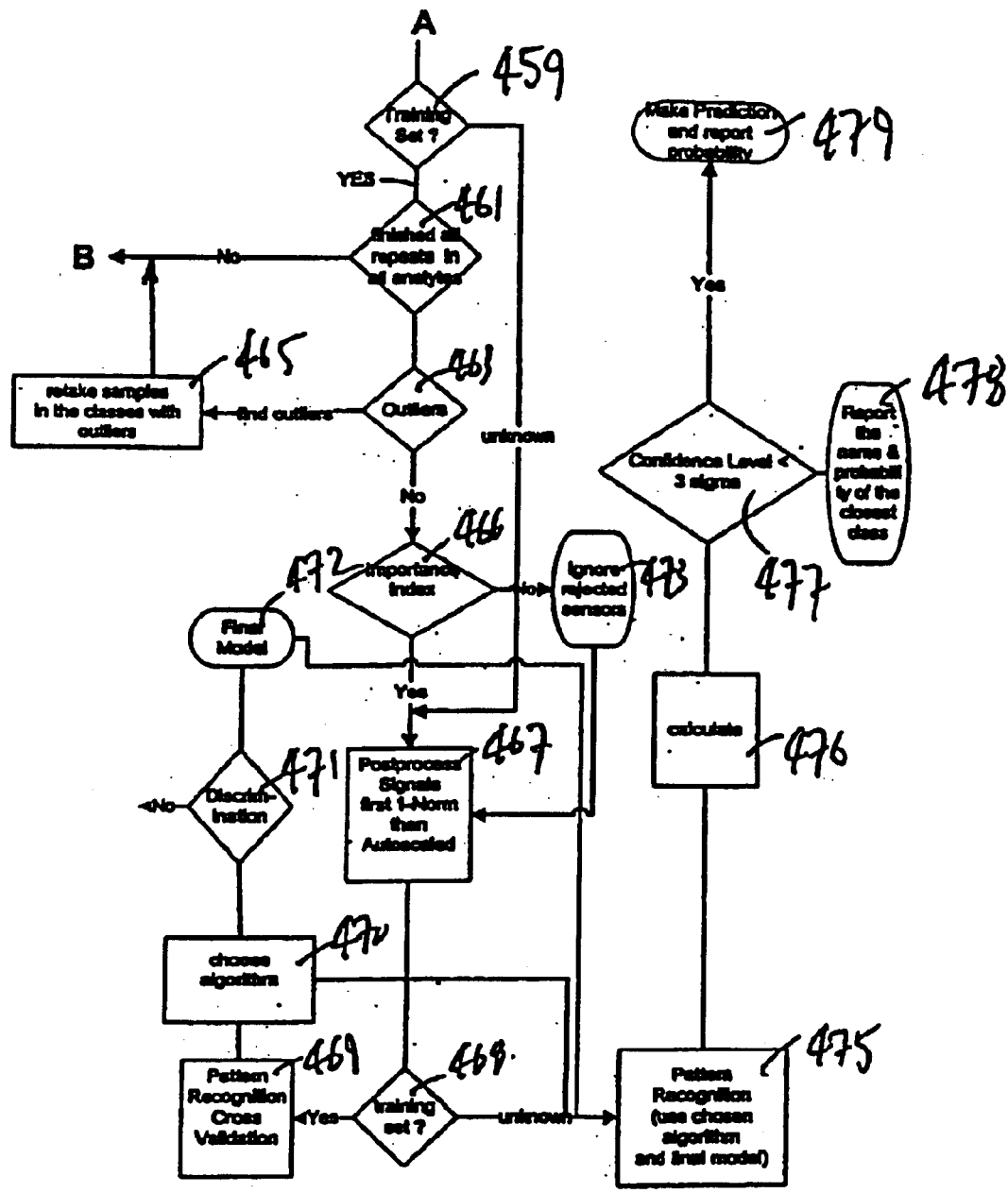

FIGS. 4D and 4E are simplified of methods 450 according to embodiments of the present invention. These diagrams are merely examples which should not limit the scope of the claims herein. One of ordinary skill in the art would recognize many other variations, modifications, and alternatives. As shown, the present method begins at step 451. Here, the method begins at a personal computer host interface, where the method provides a training set of samples (which are each defined as a different class of material) to be analyzed or an unknown sample (once the training set has been processed). The training set can be derived from a plurality of different samples of fluids (or other substances or information). The samples can range in number from more than one to more than five or more than ten or more than twenty in some applications. The present method processes one sample at a time through the method that loops back to step 451 via the branch indicated by reference letter B, for example, from step 461, which will be described in more detail below.

In a specific embodiment, the method has captured data about the plurality of samples from a data acquisition device. Here, each of the samples should form a distinct class of data according to the present invention. The data acquisition device can be any suitable device for capturing either intrinsic or extrinsic information from a substance. As merely an example, the present method uses a data acquisition device for capturing olfactory information. The device has a plurality of sensors or sensing devices, which convert a scent or olfaction print into an artificial or electronic print. In a specific embodiment, such data acquisition device is disclosed in WO 99/47905, commonly assigned and hereby incorporated by reference for all purposes. Those of skill in the art will know of other devices including other electronic noses suitable for use in the present invention. In a specific embodiment, the present invention captures olfactory information from a plurality of different liquids, e.g., isopropyl alcohol, water, toluene. The olfactory information from each of the different liquids is characterized by a plurality of measurable characteristics, which are acquired by the acquisition device. Each different liquid including the plurality of measurable characteristics can be converted into an electronic data form for use according to the present invention.

The method acquires the raw data from the sample in the training set often as a voltage measurement, step 452. The voltage measurement is often plotted as a function of time. In other embodiments, there are many other ways to provide the raw data. For example, the raw data can be supplied as a resistance, a capacitance, an inductance, a binary characteristic, a quantized characteristic, a range value or values, and the like. Of course, the type of raw data used depends highly upon the application. In some embodiments, the raw data can be measured multiple times, where an average is calculated. The average can be a time weighted value, a mathematical weighted value, and others.

Next, the method checks the base line voltages from the plurality of sensing devices used to capture information from the sample, as shown in step 453. The method can perform any of the base line correction methods described herein, as well as others. Additionally, the method can merely check to see if each of the sensing devices has an output voltage within a predetermined range. If each of the sensing devices has an output voltage within a predetermined range, each of the sensing devices has a base line voltage that is not out of range. Here, the method continues to the next step. Alternatively, the method goes to step 455, which rejects the sensing device that is outside of the predetermined voltage range, and then continues to the next step. In some embodiments, the sensing device that is outside of the tire range is a faulty or bad sensor, which should not be used for training or analysis purposes.

The method then determines if the measured voltage for each sensing device is within a predetermined range, step 454. The voltage for each sensor is provided by exposing the sensor to the sample. The exposure can be made for a predetermined amount of time. Additionally, the exposure can be repeated and averaged, either by time or geometrically. The voltage is compared with a range or set of ranges, which often characterize the sensor for the exposure. If the exposed sensing device is outside of its predetermined range for the exposure, rat the method can reject (step 455) the sensor and proceed to the next step. The rejected sensor may be faulty or bad. Alternatively, if each of the sensing devices in, for example, in the array of sensors is within a respective predetermined range, then the method continues to the next step, which will be discussed below.

The method can convert the voltage into a resistance value, step 456. Alternatively, the voltage can be converted to a capacitance, an inductance, an impedance, or other measurable characteristic. In some embodiments, the voltage is merely converted using a predetermined relationship for each of the sensing devices. Alternatively, there may be a look up table, which correlates voltages with resistances. Still further, there can be a mathematical relationship that correlates the voltage with the resistance.

The method the runs the data through one or more filters, step 457. The method filters the data to remove any imperfections, noise, etc. As merely an example, data from the present data acquisition device are often accompanied with glitches, high frequency noise, and the like. Here, the signal to noise ratio is often an important consideration for pattern recognition especially when concentrations of analytes are low, exceedingly high, or not-within a predefined range of windows according to some embodiments. In such cases, it is desirable to boost the signal to noise ratio using the present digital filtering technology. Examples of such filtering technology includes, but is not limited to a Zero Phase Filter, an Adaptive Exponential Moving Average Filter, and a Savitzky-Golay Filter, which will be described in more detail below.

The method runs a response on the data, step 458. Here, the method may perform a baseline correction step. Depending upon the embodiment, there can be many different ways to implement a baseline correction method. Here, the baseline correction method finds response peaks, calculates $\Delta R/R$, and plots the $\Delta R/R$ verses time stamps, where the data have been captured. It also calculates maximum $\Delta R/R$ and maximum slope of $\Delta R/R$ for further processing. Baseline drift is often corrected by way of the present step. Once baseline drift has been corrected, the present method undergoes a normalization process, although other processes can also be used. Here, $\Delta R/R$ can be determined using one of a plurality of methods, which are known, if any, or developed according to the present invention.

In the present embodiment, the method is for analyzing a training set of substances, step 459 (in FIG. 4E). The method then continues to step 461. Alternatively, the method skips to step 467, which will be described in one or more of the copending applications. If there is another substances in the training set to be analyzed (step 459), the method returns to by step 452 via branch B, as noted above. Here, the method continues until each of the substances in the training set has been run through the process in the present preprocessing steps. The other samples will run through generally each of the above steps, as well as others, in some embodiments.

Next, the method goes to step 463. This step determines if any of the data has an outlier. In the present embodiment, the outlier is a data point, which does not provide any meaningful information to the method. Here, the outlier can be a data point which is outside of the noise level, where no conclusions can be made. The outlier is often thought of a data point that is tossed out due to statistical deviations. That is, lowest and highest data points can be considered as outliers in some embodiments. If outliers are found, step 463, the method can retake (step 465) samples, which are exposed to the sensing devices, that have the outliers. The samples that are retaken loop back through the process via the branch indicated by reference letter B. Outliers can be removed from the data in some embodiments.

The method also can uncover important sensors using an importance index (individual filtering process). Here, the method identifies which sensors do not provide any significant information by comparing a like sensor output with a like sensor output for each of the samples in the training set. If certain sensors are determined to have little influence in the results, these sensors are ignored (step 473) and then continues to the next step, as shown in the Fig. Alternatively, if generally all sensors are determined to have some significance, the method continues to step 467.

Next, the method performs post processing procedures (step 467), as defined herein. The post processing procedures include, for example, a normalization step. In a specific embodiment, the normalization step scales the data to one or other reference value and then autoscales the data so that each sample value is referenced against each other. If the data is for the training step, step 468, the method continues to a pattern recognition cross-validation process, step 469, the cross validation process is used with step 470.

The pattern recognition process uses more than one algorithms, which are known, are presently being developed, or will be developed in the future. The process is used to find weighting factors for each of the characteristics to ultimately determine an identifiable pattern to uniquely identify each of the substances. The present method runs the data, which have been preprocessed, through each of the algorithms.

| | |
|---|---|
| PCA | Principal Components Analysis |
| HCA | Hierarchical Cluster Analysis |
| KNN CV | K Nearest Neighbor Cross Validation |
| KNN Prd | K Nearest Neighbor Prediction |
| SIMCA CV | SIMCA Cross Validation |
| SIMCA Prd | SIMCA Prediction |
| Canon CV | Canonical Discriminant Analysis and Cross Validation |
| Canon Prd | Canonical Discriminant Prediction |
| Fisher CV | Fisher Linear Discriminant Analysis and Cross Validation |
| Fisher Prd | Fisher Linear Discriminant Prediction |
| SCREAM | System Coherence Rendering Exception Analysis for Maintenance |

PCA and HCA, are unsupervised learning methods. They are used for investigating training data and finding the answers of:

I. How many principal components will cover the most of variances?

II. How many principal components you have to choose?

III. How do the loading plots look?

IV. How do the score plots look?

V. How are the scores separated among the classes?

VI. How are the clusters grouped in their classes?

VII. How much are the distances among the clusters?

The other four algorithms, KNN CV, SIMCA CV, Canon CV, and Fisher CV, are supervised learning methods used when the goal is to construct models to be used to predict the future behavior of a process. These algorithms will do cross validation, find the optimum number of parameters, and build models. SCREAM is a combination of several techniques employing time series analysis.

In a specific embodiment, the present invention provides a cross-validation technique. Here, an auto (or automatic) cross-validation algorithm can be implemented. The present technique uses cross-validation, which is an operation process used to validate models built with chemometrics algorithms based on training data set. During the process, the training data set is divided into calibration and validation subsets. A model is built with the calibration subset and is used to predict the validation subset. The training data set can be divided into calibration and validation subsets called "leave-one-out", i.e., take one sample out from each class to build a validation subset and use the rest samples to build a calibration subset. This process can be repeated using different subset until every sample in the training set has been included in one validation subset. The predicted results are stored in an array. Then, the correct prediction percentages (CPP) are calculated, and are used to validate the performance of the model.

According to the present method, a cross-validation with one training data set can be applied to generally all the models built with different algorithms, such as K-Nearest Neighbor (KNN), SIMCA, Canonical Discriminant Analysis, and Fisher Linear Discriminant Analysis, respectively. The results of correct prediction percentages (CPP) show the performance differences with the same training data set but with different algorithms. Therefore, one can pick up the best algorithm according to the embodiment, as shown in step 470.

During model building, several parameters and options may be chosen. To build the best model with one algorithm, cross-validation is also used to find the optimum parameters and options. For example, in the process of building a KNN model, cross-validation is used to validate the models built with different number of K, different scaling options, e.g., mean-centering or auto-scaling, and other options, e.g., with PCA or without PCA, to find out the optimum combination of K and other options. In a preferred embodiment, auto-cross-validation can be implemented using a single push-button or two push buttons for ease in use. It will automatically run the processes mentioned above over all the (or any selected) algorithms with the training data set to find out the optimum combination of parameters, scaling options and algorithms.

Once the best fit algorithm and model has been uncovered, the method goes through a discrimination test, step 471. In a specific embodiment, the method compares the results, e.g., fit of data against algorithm, combination of data and other preprocessing information, against confidence factor (if less than a certain number, this does not work). This step provides a final screen on the data, the algorithm used, the pre-processing methods, and other factors to see if everything just makes sense. If so, the method selects the final combination of techniques used according to an embodiment of the present invention.

The above sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives. An example according to the present invention is described in U.S. Ser. No. 09/802,513, which is incorporated by reference for all purposes.

The above example is merely an illustration, which should not unduly limit the scope of the claims herein. One of ordinary skill in the art would recognize many other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

An alternative method for identification or classification purposes according to the present invention is briefly outlined as follows:

1. Provide unknown sample;
2. Acquire raw data in voltages;
3. Check base line voltages;
4. Filter;
5. Calculate $\Delta R/R$
6. Determine Training set?
7. If yes, use method outlined above;
8. Otherwise, normalize;
9. If training set, use method outlined above;
10. Otherwise, find appropriate pattern recognition process from method above for training set;
11. Output result from pattern recognition process;
12. Check confidence level;
13. If greater than predetermined amount, go to next step, otherwise, report the name and probability of closest class;
14. Make prediction and report probability; and
15. Perform other steps, as required.

The above sequence of steps is merely an example of a way to identify or classify an unknown sample or known sample of unknown quality according to an alternative embodiment. The present example takes one substance or sample, where the substance has a plurality of characteristics, which are capable of being detected by sensors or other sensing devices. Each of these characteristics is measured, and then fed into the present method to create a training set. The method includes a variety of data processing techniques to provide the training set. Depending upon the embodiment, some of the steps may be separated even further or combined. Details of these steps are provided below according to Fig.

As shown, the present method (450) begins at step 451. Here, the method begins at a personal computer host interface, where the method provides a sample to be analyzed or an unknown sample (once the training set has been processed). The present method processes a known sample of unknown quality to determine if the quality is within or outside of a predetermined range. Alternatively, the sample may be unknown and the sample classification is determined according to an embodiment of the present invention.

In a specific embodiment, the method has captured data about the sample from a data acquisition device. Here, the sample should form a distinct class of data according to the present invention. The data acquisition device can be any suitable device for capturing either intrinsic or extrinsic information from a substance. As merely an example, the present method uses a data acquisition device for capturing olfactory information. The device has a plurality of sensors or sensing devices, which convert a scent or olfaction print into an artificial or electronic print. In a specific embodiment, such data acquisition device is disclosed in WO 99/ 47905, commonly assigned and hereby incorporated by reference for all purposes. Those of skill in the art will know of other devices including other electronic noses suitable for use in the present invention. In a specific embodiment, the present invention captures olfactory information from a plurality of different liquids, e.g., isopropyl alcohol, water, toluene. The olfactory information from each of the different liquids is characterized by a plurality of measurable characteristics, which are acquired by the acquisition device. Each different liquid including the plurality of measurable characteristics can be converted into an electronic data form for use according to the present invention.

The method acquires the raw data from the sample often as a voltage measurement, step 452. The voltage measurement is often plotted as a function of time. In other embodiments, there are many other ways to provide the raw data. For example, the raw data can be supplied as a resistance, a capacitance, an inductance, a binary characteristic, a quantified characteristic, a range value or values, and the like. Of course, the type of raw data used depends highly upon the application. In some embodiments, the raw data can be measured multiple times, where an average is calculated. The average can be a time weighted value, a mathematical weighted value, and others.

Next, the method checks the base line voltages from the plurality of sensing devices used to capture information from the sample, as shown in step 453. The method can perform any of the base line correction methods described herein, as well as others. Additionally, the method can merely check to see if each of the sensing devices has an output voltage within a predetermined range. If each of the sensing devices has an output voltage within a predetermined range, each of the sensing devices has a base line voltage that is not out of range. Here, the method continues to the next step. Alternatively, the method goes to step 455, which rejects the sensing device that is outside of the predetermined voltage range, and then continues to the next step. In some embodiments, the sensing device that is outside of the range is a faulty or bad sensor, which should not be used for training or analysis purposes.

The method then determines if the measured voltage for each sensing device is within a predetermined range, step 454. The voltage for each sensor is provided by exposing the sensor to the sample. The exposure can be made for a predetermined amount of time. Additionally, the exposure can be repeated and averaged, either by time or geometrically. The voltage is compared with a range or set of ranges, which often characterize the sensor for the exposure. If the exposed sensing device is outside of its predetermined range for the exposure, the method can reject (step 455) the sensor and proceed to the next step. The rejected sensor may be faulty or bad. Alternatively, if each of the sensing devices in, for example, in the array of sensors is within a respective predetermined range, then the method continues to the next step, which will be discussed below.

The method can convert the voltage into a resistance value, step 456. Alternatively, the voltage can be converted to a capacitance, an inductance, an impedance, or other measurable characteristic. In some embodiments, the voltage is merely converted using a predetermined relationship for each of the sensing devices. Alternatively, there may be a look up table, which correlates voltages with resistances. Still further, there can be a mathematical relationship that correlates the voltage with the resistance.

The method the runs the data through one or more filters, step 457. The method filters the data to remove any imperfections, noise, etc. As merely an example, data from the present data acquisition device are often accompanied with glitches, high frequency noise, and the like. Here, the signal to noise ratio is often an important consideration for pattern recognition especially when concentrations of analytes are low, exceedingly high, or not within a predefined range of windows according to some embodiments. In such cases, it is desirable to boost the signal to noise ratio using the present digital filtering technology. Examples of such filtering technology includes, but is not limited to a Zero Phase Filter, an Adaptive Exponential Moving Average Filter, and a Savitzky-Golay Filter, which will be described in more detail below.

The method runs a response on the data, step 458. Here, the method may perform a baseline correction step. Depending upon the embodiment, there can be many different ways to implement a baseline correction method. Here, the baseline correction method finds response peaks, calculates $\Delta R/R$, and plots the $\Delta R/R$ verses time stamps, where the data have been captured. It also calculates maximum $\Delta R/R$ and maximum slope of $\Delta R/R$ for further processing. Baseline drift is often corrected by way of the present step. Once baseline drift has been corrected, the present method undergoes a normalization process, although other processes can also be used. Here, $\Delta R/R$ can be determined using one of a plurality of methods, which are known, if any, or developed according to the present invention.

In a specific embodiment, most of the preprocessing steps, as noted above, were determined by optimum combinations of processes from the training set. The sample is run through the same or similar set of preprocessing steps. In the present embodiment, the method skips to step 467. The post processing procedures include, for example, a normalization step. In a specific embodiment, the normalization step scales the data to one or other reference value and then autoscales the data so that the sample value is referenced against each other (step 467).

Since the sample is not part of the training set process (step 468), the method goes to step 475. Here, the unknown sample is run through the algorithm selected from the training procedure, step 475. The training set uncovered the optimum or near optimum algorithm to be used by the unknown sample, which should fall into one of the classes from the training set. The sample is run through calculations (step 476) and a result or results are outputted. The result is outputted through a confidence factor (step 477). If the result is greater than a predetermined amount, the method goes to step 479. Alternatively, the method outputs a result (step 478), where the name and probability of the closest (step 455).

In step 479, the method makes the prediction and reports the probability. In some embodiments, the method identifies the unknown sample based upon its descriptor that matches a known class of samples from the training set. Alternatively, the method identifies that the sample, which is known, but may be of unknown quality, is within a predetermined range of values. Here, the method can determine if a sample, which has been derived from an industrial process, for example, is within a predetermined specification from a training step. The sample can be a final product, an intermediary product, or any other stage of manufacture or processing.

The above sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives. The above example is merely an illustration, which should not unduly limit the scope of the claims herein. One of ordinary skill in the art would recognize many other variations, modifications, and alternatives.

For example, while the above description focuses upon use of embodiments of the present invention to control an industrial process, the present invention is not limited to this application. The present invention is generally applicable to monitoring the state of complex processes, and can be utilized, for instance, to monitor the ongoing health of a piece of capital equipment such as pump, compressor, or paper manufacturing machine.

Moreover, the present invention is not limited to monitoring industrial processes. Other complex processes may be monitored in accordance with embodiments of the present invention. For example, an embodiment of the present invention could be utilized for human medical diagnosis, with non-symbolic inputs such as heart rate, medical history, blood tests etc. being combined with symbolic information such as patient demeanor, skin texture and color, etc. Based upon the various inputs, a system could provide a threshold patient assessment, and even suggest changes in treatment, subject, of course to supervision and intervention by a trained physician.

Figure 5:
FIG. 5 is a chart showing users of the Software.

In order to implement various aspects of the present invention, a software code would be utilized in conjunction with hardware. FIG. 5 is a chart showing potential users of such software.

The following tables present information relevant to aspects of embodiments of the present invention.

TABLE 1

Pre-Processing Techniques

| Pre-Processing Technique Name | Pre-Processing Technique Description |
| --- | --- |
| Data Centering and Scaling (auto-scaling) | Eliminates the units associated with different measurements (e.g., temperature, pressure) and scales the data by the variance so that all sensor responses are approximately the same scale (e.g., typically between −3 and 3) is required for PCA and PLS but is not required for SCREAM elements. |
| Data Synchronization | This feature specifically targets time lags between different sensors during data acquisition and uses a buffer to match time stamps (as closely as possible) for different sensors/systems. |
| Data Transformation/ Linearization | A transform is applied to the data to eliminate effects such as seasonal trends and/or transform the data into a linear form. |

TABLE 1-continued

Pre-Processing Techniques

| Pre-Processing Technique Name | Pre-Processing Technique Description |
| --- | --- |
| Elimination of Redundant Variables | A useful technique to reduce computation time if computation time becomes an issue during the design phase of the project. |
| Estimation of Missing Data | Data for one sensor may be missing for a variety of reasons (e.g., sensor removed, sensor not polled, reading not properly transmitted). A scheme must be developed for estimating the value of this sensor in order to use PCA or PLS models. |
| Noise Filtering | Techniques (e.g., Savitzky-Golay, exponential moving average) to reduce the effects of noise. If the noise characteristics of the sensor change, most noise filtering techniques will not remove these characteristics. Thus, the noise model in SCREAM for anomaly detection is still valid even after noise filtering |
| Outlier Detection | This step is used during model building but not while monitoring. An "outlier" is a point that is statistically quite different from all other points. Outliers must be removed during model building to obtain a good estimate of normal operations. |
| Variable Selection | Related to elimination of redundant variables. The purpose of this technique is to quickly screen the sensors and determine which of these sensors are the most significant without having to build a complex model and calculate loadings. |

TABLE 2A

Univariate Techniques

| Univariate Technique Name | Univariate Technique Description |
| --- | --- |
| Average | The arithmetic mean gained by adding two or more quantities and then dividing by the total number of quantities. |
| Standard Deviation | A statistical measure of how widely individual items in a frequency distribution differ from the mean. |
| Capability Index (Cp) | A measure of the ability of the process to make product within specification. Defined as: (high spec − low spec)/(6*sigma), where sigma is the measured standard deviation. |
| Upper Capability Index (Cp, u) | Defined as: (average value − lower spec)/(3*sigma) |
| Lower Capability Index (Cp, l) | Defined as: (high spec − average value)/(3*sigma) |
| Capability Index 2 (Cp, m) | Accounts for deviation from a target value. Defined as: Cp/sqrt(1 + (average − target)$^2$/sigma$^2$) |
| Instability Index (St) | Used to examine the stability or instability of a process over time. Defined as: (Number of out-of-control data points ÷ Total number of data points) × 100 |

TABLE 2B

Inputs And Outputs For Univariate Techniques

| Univariate Technique Name | Inputs | Expected Outputs |
| --- | --- | --- |
| Average | Sensor reading over time | Average |
| Standard Deviation | Sensor reading over time | Standard Deviation |
| Capability Index (Cp) | High Specification Low Specification Standard Deviation | Cp (Capability Index) |

TABLE 2B-continued

Inputs And Outputs For Univariate Techniques

| Univariate Technique Name | Inputs | Expected Outputs |
|---|---|---|
| Upper Capability Index (Cp, u) | Average Value Low Specification Standard Deviation | Cp, u (Upper Capability Index) |
| Lower Capability Index (Cp, l) | Average Value High Specification Standard Deviation | Cp, l (Lower Capability Index) |
| Capability Index 2 (Cp, m) | Cp (Capability Index) Average Value Target Value Standard Deviation | Cp, m (Capability Index 2) |
| Instability Index (St) | # of Out of Control Points Total # of Control Points | St (Instability Index) |

TABLE 3

Multivariate Techniques

| Multivariate Technique Name | Multivariate Technique Description |
|---|---|
| ACE (Alternating Conditional Expectations) | A multivariate non-parametric regression procedure where the objective is identical to the Additive Model (AM) but extends the capabilities of AM by allowing a functional transformation of the response variable as well as the explanatory variables. |
| AM (Additive Model) | A multivariate non-parametric regression procedure that finds sets of functions to transform the explanatory variables to maximize the correlation between the transformed explanatory variables and the response variable. |
| AVAS (Additivity and Variance Stabilization) | A multivariate non-parametric regression procedure that is an extension of Alternating Conditional Expectations (ACE) and imposes variance-stabilizing transformations. |
| CDA (Canonical Discriminant Analysis) | CDA is one of the algorithms in the larger class of discriminant algorithms that is a subset of factor analysis. A discriminant algorithm requires supervised learning and each class is known and appropriately labeled. Discriminant algorithms calculate the loadings to maximize the variance between classes. |
| CLS (Classical Least Squares) | A method of multivariate calibration. A CLS model assumes the form $X = CS + E$, where X is the response data, S is a matrix of pure component responses, C is a matrix of weights (concentrations) and E is a noise or error matrix. An estimate of S is calculated by $(C^t C)^{-1} C^t X$. |
| Genetic Algorithms | Search procedures that use the mechanics of natural selection and natural genetics. The basic operation of a genetic algorithm is simple. First a population of possible solutions to a problem is developed. Next, the better solutions are recombined with each other to form some new solutions. Finally the new solutions are used to replace the poorer of the original solutions and the process is repeated. |
| HCA (Hierarchical Cluster Analysis) | HCA is one of the algorithms in the larger class of cluster analysis. Classification is accomplished in an unsupervised mode (based on distances/similarities) and the results are shown in a dendogram. |

TABLE 3-continued

Multivariate Techniques

| Multivariate Technique Name | Multivariate Technique Description |
|---|---|
| ILS (Inverse Least Squares) | A method of multivariate calibration. ILS models assume the form $y = Xb + e$, where y is a property to be predicted, X is the measured response, b is the vector of weights and e is the noise or error vector. |
| K-means | K-means is one of the algorithms in the larger class of cluster analysis. For K-means the user inputs the number of expected classes and loadings are calculated to group the scores into this many clusters. |
| k-Nearest Neighbors (kNN) | kNN is one of the algorithms in the larger class of cluster analysis. Supervised learning is required since each class must be labeled. A new sample is identified as the class that has k neighbors nearest the unknown, or the largest number of neighbors within the k nearest neighbors. |
| LOESS (Locally Weighted Regression) | The LOESS model performs a linear regression on points in the data set, weighted by a kernel centered at x. The functional form of the kernel changes depending on the sensitivity and span required for the given problem. |
| MARS (Multivariate Adaptive Regression Splines) | A multivariate non-parametric regression procedure. The MARS procedure builds flexible regression models by fitting separate splines (or basis functions) to distinct intervals of the predictor variables. |
| MLR (Multiple Linear Regression) | A method of inverse least squares. The weights can be calculated by $b = X^+ y$, where $X^+$ is a pseudo-inverse. The pseudo-inverse is defined $(X^t X)^{-1} X^t$. |
| Multi-Block PCA | PCA models are developed for each subsystem or unit operation. The outputs of the models for subsystems are used as inputs for a single process model. |
| Multi-Way PCA | Multi-Way PCA is useful for batch processes or other transient data (a window of data for a continuous process). Rather than the typical 2-dimensional array for PCA, multi-way PCA is a 3-dimensional array that still uses PCA for analysis. Specific algorithms include PARAFAC and Tucker3. |
| Neural Networks, Neural Nets (NN) | Neural Nets estimate relationships between one or several input variables called independent variables or descriptors (e.g. absorbance at different wavelengths) and one or several output variables called dependent variables or responses (e.g. concentration of a target analyte), without any a priori assumption of a specific model form. Information in a NN is distributed among multiple cells (nodes) and connections between the cells (weights). |
| PCA (Principal Component Analysis), PA | PCA is one of the algorithms in the larger class of factor analysis. In PCA factors are calculated by forming a linear combination of the sensor responses. PCA can be used in an unsupervised mode. The coefficients (loadings) are calculated based on capturing the greatest amount of variance subject to orthogonal constraints. |
| PCR (Principal Components Regression) | A method of inverse least squares that is commonly used to deal with ill-conditioned regression problems by regressing the property of interest (y) onto PCA scores. The pseudo-inverse is defined as $P_k (T_k^t T_k)^{-1} T_k^t$; $P_k$ and $T_k$ have the usual definitions for PCA-loadings and scores, respectively. |

TABLE 3-continued

Multivariate Techniques

| Multivariate Technique Name | Multivariate Technique Description |
|---|---|
| PLS (Partial Least Squares) | A method of Inverse Least Squares (ILR) that addresses one of the shortcomings of Principal Components Regression (PCR). In PCR the loadings are calculated without using the information contained in the property of interest even when the data is available. PCR captures maximum variance of X (just like PCA), MLR achieves maximum correlation of X with y (at the expense of variance within x), and PLS maximized the covariance between X and y. The pseudo-inverse is calculated by $W_k(P_k^T W_k)^{-1}(T_k^T T_k)^{-1}T_k^t$, where W is additional set of weights to maintain orthogonality. |
| PPR (Projection Pursuit Regression) | A multivariate non-parametric regression procedure. Projects the data onto a smaller number of dimensions and then allows rotation to pursue interesting features. |
| RPR (Recursive Partitioning Regression) | A multivariate non-parametric regression procedure that was designed to find local low-dimensional structure in functions that shows high-dimensional global dependence. The output is a decision tree or dendogram. |
| SIMCA (Soft Independent Modeling of Class Analogy) | SIMCA considers each class separately. For each class separately a principal component analysis is performed which leads to a PC model for each class (so-called disjoint class models). Supervised training is required for classification. |

TABLE 4

SCREAM Techniques

| SCREAM Technique Name | Description |
|---|---|
| Model Filter ("Grey Box") | Separates time-correlated sensor data (known physical behavior, stationary components, linear components, non-linear components, noise). Combines data components with physical or heuristic models of arbitrary quality. |
| Symbolic Data Model | Considers all discrete signals from the system. Detects and enumerates state mismatches and explicit failures. Identifies operating mode of the system. Predicts state of system components. |
| Coherence Based Fault Detector | Computes a single, complex, cross-signal invariant ("Coherence Plot") for each subsystem. Matches invariant to mode-indexed invariant prediction. Identifies and quantifies deviations (single signal departures, multiple signal departures, known or novel events). Identifies return to expected behavior. Isolates deviation to sensors, sensor pairs, and timetags events. |
| Dynamical Invariant Anomaly Detector | Examines individual signals (either signals with low redundancy or signals identified by Coherence Detector). Extracts invariant features from corrected sensor data. Identifies and quantifies deviations (confirms or augments cross-channel findings, classifies as known or novel events. |

TABLE 4-continued

SCREAM Techniques

| SCREAM Technique Name | Description |
|---|---|
| Informed Maintenance Grid (IMG) | Studies the evolution of cross-channel behavior over the medium- and long-term operation of the system. |
| Prognostic Assessment | Feature-based and Coherence-based trending to failure. Inclusion of physics models. Determination based on performance characteristics and fused information. Capability to use failure models or fault data. |
| Predictive Comparison | Combines numeric and symbolic results into a unified result. Correlates detected events with predicted states to derive predicted failures and un-modeled events. Processes explicit anomalies and correlates them to detected events. |

GLOSSARY

The following represents a concise explanation of certain terms referenced in the above discussion. This listing is for informational purposes only, and is not intended to define or otherwise limit the terms. Other meanings of the listed terms may be understood.

Bluetooth: A set of radio wave communication protocols and standards that enable low-cost, high-speed communication among devices that are within 10 meters (approximately 33 feet) of each other (this distance can be increased to 100 meters with amplifiers or increasing the transmit power).

Foundation Fieldbus: A bi-directional communications protocol used for communications among field instrumentation and control systems. Foundation Fieldbus is the only digital fieldbus protocol developed to meet the ISA's SP50 requirements, and is the only protocol that meets stringent, mission-critical demands for intrinsic safety and use in hazardous areas, volatile processes and difficult regulatory environments.

GUI: Graphical User Interface.

HMI (Human Machine Interface): Also known as man machine interface. Systems for operating plants, monitoring processes and backing up data in industrial manufacturing processes. Smaller packaging machines have simple control units while powerful visualization systems based on industrial PCs are often used in complex packaging lines. Such systems display the operating processes in a machine as flow diagrams and allow more transparency in their monitoring. Important operational data are recorded and graphically displayed. If something is not running properly, an alarm is generated immediately.

JPL (Jet Propulsion Laboratory): Managed for NASA by the California Institute of Technology, the Jet Propulsion Laboratory is the lead U.S. center for robotic exploration of the solar system. In addition to its work for NASA, JPL conducts tasks for a variety of other federal agencies. JPL also manages the worldwide Deep Space Network, which communicates with spacecraft and conducts scientific investigations from its complexes in California's Mojave Desert near Goldstone; near Madrid, Spain; and near Canberra, Australia.

OPC (OLE for Process Control): A communication standard based on OLE (Object Linking & Embedding) and COM (Component Object Model) technology that forms the new means of exchanging information between MS Windows applications. It offers interoperability between the control, command, supervision applications, the industrial equipment (PLCs, sensors, actuators) and the office management applications. OPC defines standard objects, methods and properties built on the COM concept to allow real time data servers like DCS, PLC and field equipment to communicate their data to OPC clients.

PLC (Programmable Logic Controller): A device that can be programmed to react to input signals. Modern day PLCs are sophisticated enough to perform any control task. PLCs are rugged, reliable, and easy to program. They are economically competitive with other control methods and have replaced conventional hard-wired relay and timer panels in many applications. PLCs can stand alone, be networked together, or networked to an Operator Interface or SCADA system.

O(O-Residual): A measure of deviation from a model where the deviation is outside the model. This measurement is referred to as Q or Q-Residual for PCA. For PLS, it is called Residual.

SCADA (Supervisory Control and Data Acquisition): Contains components of control, analysis, monitoring, storage and management of the information flow between the systems at the field level and the control level of a company. This ensures that the decentralized I/O modules and the machine controllers are linked to the office computers on the control level.

SCREAM (System Coherence Rendering Exception Analysis for Maintenance): A collection of models based on technology developed at JPL that provide intelligence for system self-analysis. Originally called BEAM (Beacon-Based Exception Analysis for Multimissions) at JPL.

SPC: Statistical Process Control.

$T^2$ (Hotelliny $T^2$): A measure of deviation from a model where the deviation is within the model.

Virtual Sensor: A collection of sensors, often used to measure a single unit operation, that can be treated as a single unit (e.g., the 32 sensors in the Cyranose 320). Individual sensors in the virtual sensor are given a weighting, and a resulting score is calculated. A virtual sensor may be treated like a regular sensor in a model.

Again, it is emphasized that the above-listed concise explanation of terms is for informational purposes only and is not intended to limit or otherwise define the term for purposes of this application or the claims set forth herein. Other meanings of the listed terms may be understood.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for monitoring an industrial process, the system comprising;
    a process controller;
    an input module coupled to the process controller, the input module being adapted to input a plurality of parameters from a process for manufacture of a substance;
    an external system coupled to the process controller;
    a computer aided process module coupled to the process controller, the computer aided process module being adapted to compare at least two of the plurality of parameters against a predetermined training set of parameters, and being adapted to determine if the at least two of the plurality of parameters are within a predetermined range of the training set of parameters; and
    an output module coupled to the process controller, the output module being adapted to output a result based upon the determining step and the external system,
    wherein the external system corresponds to a second process that is substantially duplicative of the process for manufacture of a substance.

2. The system of claim 1 wherein the substance is selected from a petroleum product, a chemical product, a food product, a health product, a cleaning product, a biological product, and other fluid or objects.

3. The system of claim 1 wherein the plurality of parameters are selected from an intrinsic element or an extrinsic element of the process.

4. The system of claim 1 wherein the input module, the computer aided process module, and the output module are provided in a computer software program.

5. The system of claim 1 wherein the computer aided process includes an algorithm selected from PCA, HCA, KNN CV KNN Prd, SIMCA CV, SIMCA Prd, Canon Prd, SCREAM, and Fisher CV.

6. The system of claim 1 further comprising a normalizing module coupled to the process controller, the normalizing module being adapted to normalize each of the plurality of parameters before input into the computer aided process module.

7. The system of claim 1 wherein the training step set of parameters are preprocessed in at least two of the computer aided processes.

8. The system of claim 1 wherein the result is an affirmative response or a negative response, where the response is displayed on a terminal.

9. The system of claim 1 wherein the computer aided process is selected from a library comprising a plurality of processes.

10. The system of claim 9 wherein the plurality of processes includes at least a comparing process, a contrasting process, and a functional process.

11. A system for monitoring an industrial process for the manufacture of materials or objects, the system comprising:
    an input module, the input module being adapted to input a plurality of process parameters from a process for manufacture of a substance or object;
    a library module coupled to the input module, the library module including a plurality of computer aided processes, each of the computer aided processes being capable of determining an output based upon a predetermined training set of the plurality of process parameters;
    an external system;
    an output module coupled to the library module and the external system, the output module being adapted to output a result based upon the external system, the predetermined training set, and the plurality of process parameters;
    wherein each of the computer aided processes compares at least two of the plurality of process parameters against a portion of the training set of parameters and determines if the at least two of the plurality of process parameters are within a predetermined range of the portion of the training set of parameters, wherein the external system corresponds to a physical process that provides data to the process controller to be used to compare against the plurality of parameters obtained from the process for manufacture of a substance or object.

12. The system of claim 11 wherein the substance is selected from petroleum product, a chemical product, a food product, a health product, a cleaning product, a biological product, and other fluid or objects.

13. The system of claim 11 wherein the plurality of process parameters are selected from an intrinsic element or an extrinsic element of the process.

14. The system of claim 11 wherein the input module, the library module, and the output module are provided in a computer software program.

15. The system of claim 11 wherein the computer aided process includes an algorithm selected from PCA, HCA, KNN CV KNN Prd, SIMCA CV, SIMCA Prd, Canon Prd, SCREAM, and Fisher CV.

16. The system of claim 11 wherein the training set of parameters are preprocessed.

17. The system of claim 11 wherein the process parameters comprise at least olfactory information.

18. The system of claim 11 wherein the result is an affirmative response or a negative response, where the response is displayed on a terminal.

19. The system of claim 11 wherein the library module comprises a plurality of processes.

20. The system of claim 19 wherein the plurality of processes includes at least a comparing process, a contrasting process, and a functional process.

21. A system for controlling a process, the system comprising:
a first field mounted device in communication with a process and configured to produce a first input; and
process manager receiving the first input and configured to apply a first model to the first input to identify a first predicted descriptor characteristic of a state of the process, and configured to consult a first knowledge based system to provide an output based upon the first predicted descriptor and an external system,
wherein the external system corresponds to a second process that is substantially duplicative of the process.

22. The system of claim 21 wherein the process manager is a server in communication with the first field mounted device via a computer network.

23. The system of claim 21 wherein the process manager is a server in communication with a user through a network of computers utilizing a browser software program.

24. The system of claim 23 wherein the process manager is in communication with the first field mounted device via the computer network.

25. The system of claim 21 further comprising a second field mounted device receiving the output and adjusting an operational parameter of the process according to the output.

26. The system of claim 21 further comprising an output module including an interface between the process manager and an associated system including at least one of a legacy system, an e-enterprise system, and a desktop application.

27. The system of claim 21 wherein the first knowledge based system is an expert system.

28. The system of claim 21 wherein the model is constructed utilizing one of a univariate statistical technique, a multivariate statistical technique, a time series analysis, and a neural-based technique.

29. The system of claim 21 further comprising a library configured to store one of a group of different algorithms utilized to construct the first model.

30. The system of claim 21 further comprising:
a second model; and
a second knowledge based system, the process manager applying the second model to the data to identify a second predicted descriptor characteristic of the process data, the second knowledge based system submitting one of the first predicted descriptor and the second predicted descriptor to the first knowledge based system where the first predicted descriptor is different from the second predicted descriptor.

31. A system for controlling a process, the system comprising:
a first field mounted device in communication with a process and configured to produce a first input;
process manager receiving the first input and configured to apply a first model to the first input to identify a first predicted descriptor characteristic of a state of the process, and configured to consult a first knowledge based system to provide an output based upon the first predicted descriptor and an external system; and
a second model, the process manager configured to apply the second model to the data to identify a second predicted descriptor characteristic of the process data, the process manager further configured to produce the output based upon the first predicted descriptor and the second predicted descriptor.

32. A monitoring system comprising:
a plurality of field mounted devices configured to detect characteristics reflecting an environmental condition;
a processor in communication with the plurality of field mounted devices and configured to receive the detected characteristics;
a plurality of external data sources in communication with the processor over a network, the plurality of data sources storing data relevant to the environmental condition; and
a computer aided process module coupled to the processor, the computer aided process module being adapted to compare the detected characteristics with the data stored by the plurality of data sources; and
an output module coupled to the processor, the output module being adapted to generate an output based upon comparison of the detected characteristics with the stored data,
wherein the plurality of external data sources comprise external systems, and
wherein the external systems are selected from the group consisting of an ERP system, a LIMS system, and one of a duplicate and a sister of the process, such that the state of the environment may be analysed based on information obtained from the external system.

33. The system of claim 32 wherein said plurality of field mounted devices includes at least one of a chemical sensor, a radiation sensor, and a biological sensor.

34. The system of claim 33 wherein said chemical sensor is configured to produce a response in the presence of a chemical stimulus selected from the group consisting of a vapor, a gas, a liquid, a solid, an odor or mixtures thereof.

35. The system of claim 34 wherein said chemical sensor is selected from the group consisting of a conducting/nonconducting regions sensor, a SAW sensor, a quartz microbalance sensor, a conductive composite sensor, a chemiresistor, a metal oxide gas sensor, an organic gas sensor, a MOSFET, a piezoelectric device, an infrared sensor, a sintered metal oxide sensor, a Pd-gate MOSFET, a metal FET structure, electrochemical cell, a conducting polymer sensor, a catalytic gas sensor, an organic semiconducting gas sensor, a solid electrolyte gas sensor, and a piezoelectric quartz crystal sensor.

36. The system of claim 33 wherein said radiation sensor is configured to produce a response in the presence of a stimulus selected from the group consisting of gamma rays, X-rays, ultra-violet rays, visible radiation, infrared, microwaves, and radio waves.

37. The system of claim 33 wherein said biological sensor is configured to produce a response based upon the presence of an organism or a biochemical molecule.

38. The system of claim 32 wherein the plurality of data sources are selected from the group consisting of a database, an algorithm, a model, and a knowledge based system.

39. The system of claim 38 wherein the data comprises characteristics detected at a previous time or in a different location.

40. The system of claim 38 wherein the data comprises a result from a model or algorithm having the detected characteristics as input.

41. The system of claim 38 wherein the knowledge based system is selected from the group consisting of an expert system, a self-learning system, a logic system, and a fuzzy variant of the same.

42. The system of claim 32 further comprising a model generation module for generating a model of a phenomenon.

43. The system of claim 42 wherein said model generation module generates a model derived from an event producing at least one of chemical, biological, and radiation stimuli in the environment.

44. The system of claim 32 further comprising a diagnostic module identifying an event producing at least one of a chemical, biological, and radiation stimulus.

45. The system of claim 32 wherein the output comprises notification regarding occurrence of an event.

46. The system of claim 45 further comprising a module for initiating follow-on actions upon occurrence of the event.

47. The system of claim 45 further comprising a communication module for communicating the output to alert a human monitor.

48. The system of claim 47 wherein the communication module includes a server storing the output for access by a user through a browser software program.

49. The system of claim 32 further comprising an associated system in communication with the processor over a network, the associated system including at least one of a legacy system, an e-enterprise system, and a desktop application.

50. The system of claim 32 further comprising a preprocessing module configured to modify the detected conditions.

51. A system for monitoring an industrial process, the system comprising:
  a process controller;
  an input module coupled to the process controller, the input module being adapted input a plurality of parameters from a process for manufacture of a substance;
  an external system coupled to the process controller;
  a computer aided process module coupled to the process controller, the computer aided process module being adapted to compare at least two of the plurality of parameters against a predetermined training set of parameters, and being adapted to determine if the at least two of the plurality of parameters are within a predetermined range of the training set of parameters; and
  an output module coupled to the process controller, the output module being adapted to output a result based upon the determining step and the external system,
  wherein the external system is selected from the group consisting of an ERP system, a LIMS system, and one of a duplicate and a sister of the process.

52. The system of claim 51 wherein the external systems comprise a second process that is one of a duplicate and a sister of the process, such that a state of the process may be validated by comparison with the external system.

53. A system for monitoring an industrial process for the manufacture of materials or objects, the system comprising:
  an input module, the input module being adapted to input a plurality of process parameters from a process for manufacture of a substance or object;
  a library module coupled to the input module, the library module including a plurality of computer aided processes, each of the computer aided processes being capable of determining an output based upon a predetermined training set of the plurality of process parameters;
  an external system;
  an output module coupled to the library module and the external system, the output module being adapted to output a result based upon the external system, the predetermined training set, and the plurality of process parameters;
  wherein each of the computer aided processes compares at least two of the plurality of process parameters against a portion of the training set of parameters and determines if the at least two of the plurality of process parameters are within a predetermined range of the portion of the training set of parameters,
  wherein the external systems are selected from the group consisting of an ERP system, a LIMS system, and one of a duplicate and a sister of the process.

54. The system of claim 53 wherein the external systems comprise a second process that is one of a duplicate and a sister of the process, such that a state of the process may be validated by comparison with the external system.

55. A system for controlling a process, the system comprising:
  a first field mounted device in communication with a process and configured to produce a first input; and
  process manager receiving the first input and configured to apply a first model to the first input to identify a first predicted descriptor characteristic of a state of the process, and configured to consult a first knowledge based system to provide an output based upon the first predicted descriptor and an external system,
  wherein the external systems are selected from the group consisting of an ERP system, a LIMS system, and one of a duplicate and a sister of the process.

56. The system of claim 55 wherein the external systems comprise a second process that is one of a duplicate and a sister of the process, such that a state of the process may be validated by comparison with the external system.

* * * * *